United States Patent
Janin et al.

(10) Patent No.: US 11,830,000 B2
(45) Date of Patent: *Nov. 28, 2023

(54) SYSTEMS FOR REIMBURSING AND RECONCILING PHARMACY-RELATED TRANSACTIONS

(71) Applicant: Truveris, Inc., New York, NY (US)

(72) Inventors: Bertrand Janin, West Orange, NJ (US); Anthony Joseph Loiacono, Bayonne, NJ (US)

(73) Assignee: Truveris, Inc., New York, NY (US)

( * ) Notice: Subject to any disclaimer, the term of this patent is extended or adjusted under 35 U.S.C. 154(b) by 104 days.

This patent is subject to a terminal disclaimer.

(21) Appl. No.: 17/667,271

(22) Filed: Feb. 8, 2022

(65) Prior Publication Data
US 2022/0164793 A1    May 26, 2022

Related U.S. Application Data

(63) Continuation of application No. 15/457,974, filed on Mar. 13, 2017, now Pat. No. 11,244,310.
(Continued)

(51) Int. Cl.
*G06Q 20/38* (2012.01)
*G06Q 20/40* (2012.01)
*G06Q 10/10* (2023.01)

(52) U.S. Cl.
CPC ......... *G06Q 20/3825* (2013.01); *G06Q 10/10* (2013.01); *G06Q 20/389* (2013.01); *G06Q 20/4016* (2013.01)

(58) Field of Classification Search
CPC .. G06Q 20/3825; G06Q 10/10; G06Q 20/389; G06Q 20/4016
See application file for complete search history.

(56) References Cited

U.S. PATENT DOCUMENTS 6,305,377 B1   10/2001   Portwood et al.
7,356,696 B1    4/2008   Jakobsson
(Continued)

OTHER PUBLICATIONS

Nakamoto, Satoshi, "Bitcoin: A Peer-to-Peer Electronic Cash System," Oct. 31, 2008, [retrieved online at <URL: https://bitcoin.org/bitcoin.pdf>, on Jun. 15, 2017], 9 Pages.

*Primary Examiner* — James D Nigh
*Assistant Examiner* — Chunling Ding
(74) *Attorney, Agent, or Firm* — Sheppard, Mullin, Richter & Hampton LLP

(57) ABSTRACT

An example method of reimbursing pharmacy-related transactions includes receiving first data describing a transaction between a patient and a pharmacy. The transaction includes dispensing of a medication. A reimbursement data packet is determined based on the first data. The reimbursement data packet includes second data describing a reimbursement claim to be submitted to a payer system for the transaction. The reimbursement data packet is transmitted from the computer system to a plurality of other computer systems. A response is received from each of the other computer systems. Each response indicates whether a respective one of the other computer systems determined that the reimbursement claim is valid. A determination is made that the reimbursement claim is valid based on the responses. An entry describing the transaction and reimbursement claim is added to a ledger, and the reimbursement claim is submitted for fulfillment.

16 Claims, 18 Drawing Sheets

Related U.S. Application Data

(60) Provisional application No. 62/307,054, filed on Mar. 11, 2016.

(56) References Cited

U.S. PATENT DOCUMENTS

| | | | |
|---|---|---|---|
| 7,600,255 B1 | 10/2009 | Baugher | |
| 7,926,709 B1 | 4/2011 | Dooley et al. | |
| 8,412,952 B1 | 4/2013 | Ramzan | |
| 8,457,992 B1* | 6/2013 | Harding | G06Q 40/08 705/35 |
| 8,489,411 B1* | 7/2013 | Rowe, III | G06Q 30/04 705/2 |
| 9,298,806 B1 | 3/2016 | Vessenes et al. | |
| 9,779,129 B1 | 10/2017 | Lequeux | |
| 10,366,784 B1* | 7/2019 | Eller | G16H 10/60 |
| 10,373,255 B1* | 8/2019 | Cedergreen | G16H 20/10 |
| 2004/0138941 A1 | 7/2004 | Salgado | |
| 2006/0184391 A1* | 8/2006 | Barre | A61K 8/732 705/2 |
| 2006/0212318 A1 | 9/2006 | Dooley et al. | |
| 2014/0278456 A1 | 9/2014 | Milosevich et al. | |
| 2015/0332283 A1* | 11/2015 | Witchey | G16H 10/60 705/3 |
| 2016/0012465 A1* | 1/2016 | Sharp | G06Q 20/321 705/14.17 |
| 2016/0117471 A1* | 4/2016 | Belt | G16H 20/10 705/2 |
| 2016/0224949 A1* | 8/2016 | Thomas | G06Q 20/401 |
| 2017/0005804 A1* | 1/2017 | Zinder | H04L 9/3239 |
| 2017/0039330 A1* | 2/2017 | Tanner, Jr. | G06Q 20/065 |
| 2017/0161439 A1* | 6/2017 | Raduchel | G16H 10/60 |

\* cited by examiner

SYSTEMS FOR REIMBURSING AND RECONCILING PHARMACY-RELATED TRANSACTIONS

CROSS-REFERENCE TO RELATED APPLICATIONS

The present application is a continuation application of U.S. patent application Ser. No. 15/457,974, filed Mar. 13, 2017, which claims the benefit of U.S. Provisional Patent Application Ser. No. 62/307,054, filed Mar. 11, 2016 and entitled "Systems for Reimbursing and Reconciling Pharmacy-Related Transactions," which is hereby incorporated by reference herein.

TECHNICAL FIELD

This disclosure pertains to systems for reimbursing and reconciling pharmacy-related transactions.

BACKGROUND

In general, patients can fulfill medical prescriptions at retail pharmacies. For example, a patient can obtain a prescription for a particular medication from his physician, and submit that prescription to a pharmacy for fulfillment. The pharmacy can validate the prescription with the physician and dispense the medication to the patient.

In many cases, patients are medically insured, and the cost of their prescribed medications may be covered, at least in part, by their medical insurance policies. To facilitate the fulfillment of prescriptions, a retail pharmacy will often submit insurance claims on behalf of the patient to a payer associated with the insurance policy (e.g., a self-insured corporation, union, government entity, or health insurance carrier). For example, a retail pharmacy can obtain information regarding a patient's medical insurance, and sell the prescribed medication to the patient at a subsidized rate (e.g., a retail or pre-determined price of the medication, less an amount to be covered by the patient's insurance policy). The pharmacy reports the transaction to a payer associated with the insurance policy, and later receives reimbursement for the subsidized cost.

In many cases, a pharmacy benefit manager (PBM) can act as a financial intermediary between several retail pharmacies and payers. For example, a PBM can collect numerous transactions from several pharmacies, then submit a consolidated set of transactions to each corresponding payer. In turn, each payer reimburses the PBM for the consolidated transactions, and the PBM redistributes the reimbursement to each corresponding pharmacy.

In many cases, however, the process of consolidating transactions by a PBM, processing the consolidated transactions by the payer, reimbursing the PBM, and redistributing reimbursements to pharmacies can be a lengthy and opaque process. As such, there may be a substantial amount of time between when a pharmacy sells a medication at a subsidized cost and when the pharmacy is ultimately reimbursed for the sale. Thus, pharmacies would greatly benefit from a process capable of validating prescription transactions and reimbursing payments in an open, timely, and efficient manner.

SUMMARY

In general, in an aspect, a method of reimbursing pharmacy-related transactions includes receiving, at a computer system, first data describing a transaction between a patient and a pharmacy. The transaction includes dispensing of a medication. A reimbursement data packet is determined at the computer system based on the first data. The reimbursement data packet includes second data describing a reimbursement claim to be submitted to a payer for the transaction. The reimbursement data packet is transmitted from the computer system via a computer network to a plurality of other computer systems. A response is received via the computer network from each of the other computer systems. Each response indicates whether a respective one of the other computer systems determined that the reimbursement claim is valid. A determination is made at the computer system that the reimbursement claim is valid based on the responses. An entry describing the transaction and reimbursement claim is added to a ledger, and the reimbursement claim is submitted over the computer network for fulfillment.

Implementations of this aspect may include or more of the following features.

In some implementations, the method can further include transmitting at least a portion of the ledger to one or more of the other computer systems. The method can also further include cryptographically signing the portion of the ledger prior to transmitting the portion of the ledger to the one or more of the other computer systems. The portion of the ledger can include the entry describing the transaction and reimbursement claim.

In some implementations, the reimbursement claim can be submitted to the payer for fulfillment.

In some implementations, the reimbursement claim can be submitted to a broker for fulfillment by the payer.

In some implementations, the medication can be a prescription medication.

In some implementations, the ledger can be stored on the computer system.

In general, in another aspect, a system for reimbursing pharmacy-related transactions includes a first computer system, and one or more other computer systems communicatively coupled to the first computer system via a computer network. The first computer system is configured to receive first data describing a transaction between a patient and a pharmacy. The transaction includes dispensing of a medication. The first computer system is also configured to determine a reimbursement data packet based on the first data. The reimbursement data packet includes second data describing a reimbursement claim to be submitted to a payer for the transaction. The first computer system is also configured to transmit, via the computer network, the reimbursement data packet to the one or more other computer systems, and receive, via the computer network, a response from the one or more other computer systems. Each response indicates whether a respective one of the other computer systems determined that the reimbursement claim is valid. The first computer system is also configured to determine that the reimbursement claim is valid based on the responses, add an entry describing the transaction and reimbursement claim to a ledger, and submit, over the computer network, the reimbursement claim for fulfillment.

Implementations of this aspect may include or more of the following features.

In some implementations, the first computer system can be further configured to transmit at least a portion of the ledger to one or more of the other computer systems. The first computer system also can be configured to cryptographically sign the portion of the ledger prior to transmitting the portion of the ledger to the one or more of the other computer systems. The portion of the ledger can include the entry describing the transaction and reimbursement claim.

In some implementations, the first computer system can be configured to submit the reimbursement claim to the payer for fulfillment.

In some implementations, the first computer system can be configured to submit the reimbursement claim to a broker for fulfillment by the payer.

In some implementations, the medication can be a prescription medication.

In some implementations, the ledger can be stored on the first computer system.

One or more of the implementations described herein can provide various benefits. For instance, one or more implementations address various technical issues arising in the context of a computer-based system. As an example, as the validation process is distributed across multiple different entities, the validation and reimbursement process is more transparent and understandable to each of the entities. For instance, each pharmacy has access to the criteria by which reimbursement claims are validated, and can itself validate reimbursement claims made by others using the same criteria. Further, as each entity maintains a ledger of each of the reimbursement transactions performed on the system, each entity independently is able to analyze the reimbursement activity of others. This is beneficial, for example, as it can reduce the amount of fraud, unfair practices, or uncompetitive behavior between each of the parties (which might otherwise be hidden from scrutiny).

Further, as each of the reimbursement claims is validated in a substantially automated manner, the reimbursement process can be performed relatively quickly (e.g., on the order of seconds, minutes, or hours). Thus, the parties can reconcile their transactions and/or receive reimbursements quickly and efficiently.

Further, as the reimbursement process is distributed across multiple different computing systems (e.g., across multiple computing systems operated by multiple different pharmacies, PBMs, payers, and/or brokers), the system is highly decentralized. As such, the system is less susceptible to localized points of failure (e.g., failures of an isolated number of computer systems or the network connectivity between them), and is more likely to remain functional despite adverse conditions. Similarly, as a copy of the ledger is maintained across multiple computing systems, the need to backup individual computing systems is reduced, as the system can continue to function even when one or more individual computing systems are disrupted.

Further, entities can freely join and leave the reimbursement system (e.g., by joining as additional "nodes" in the system to validate reimbursement claims and submit their own reimbursement). Thus, the system is highly flexible and scalable, and can readily accommodate any number of participants, and any combination of participants.

Further still, the system enables users to exchange information in a secure manner (e.g., via encrypted transmissions between computing systems), such that sensitive data (e.g., financial or medication information) is less likely to be intercepted by unauthorized parties. Similarly, the system also enables users to exchange money in a secure manner, such that money is less likely to be stolen or misrouted by unauthorized parties.

Further still, the system can be implemented over a variety of different computing networks, including the Internet. Thus, in some cases, the system can be deployed, maintained, and expanded without significant additional infrastructure.

Further still, the system enables its users to collect longitudinal data regarding one or more entities associated with the system. For instance, as implementations of the system maintain complete (or substantially complete) records of the transactions conducted using the system, users of the system can collect and analyze data to determine overall market trends (e.g., overall prescription trends of doctors, overall market share of pharmacies, overall patient health for a population, and so forth), as well as individualized trends (e.g., the prescription trends of individual doctors, the market share of particular pharmacies, the medical histories of specific patients, and so forth).

In some cases, an employer can use the system to obtain information regarding each of its employees. This can be beneficial, for example, as it allows the employer to better understand the health of its employees. Further, it also allows employers to quickly and efficiently obtain information regarding new employees (e.g., new hires), and understand each new employee's impact on the employer's medical benefits policies.

The details of one or more embodiments are set forth in the accompanying drawings and the description below. Other features and advantages will be apparent from the description and drawings, and from the claims.

DETAILED DESCRIPTION

Implementations of a system for reimbursing and reconciling pharmacy-related transactions are described below. One or more implementations can be used to facilitate transactions between a pharmacy, a pharmacy benefit manager, and/or a payer (e.g., to reimburse and reconcile transactions associated with the fulfillment of medical prescriptions).

As an example, some implementations enable a pharmacy to submit reimbursement claims to one or more other entities (e.g., other pharmacies or pharmacy benefit managers). Each of the other entities individually determines the validity of the reimbursement claim, and reports the result of the validation to the pharmacy that submitted the reimbursement claim. If the other entities collectively determine that the reimbursement claim is valid (e.g., if a sufficient number and/or percentage of the other entities validate the reimbursement claim), the pharmacy records the transaction in a ledger. The ledger is periodically distributed between each of the parties (e.g., between the pharmacies, the pharmacy benefit managers, and the payers), such that each of the entities has a consistent record of each of the reimbursement claims that were submitted and validated between them. Thus, the reimbursement process between each of the entities is transparent and available for collective examination. This is beneficial, for example, as it can reduce the amount of fraud, unfair practices, or uncompetitive behavior between each of the parties (which might otherwise be hidden from scrutiny). Further, the reimbursement process can be performed relatively quickly (e.g., on the order of seconds, minutes, or hours). Thus, the parties can reconcile their transactions and/or receive reimbursements quickly and efficiently.

Figure 1:
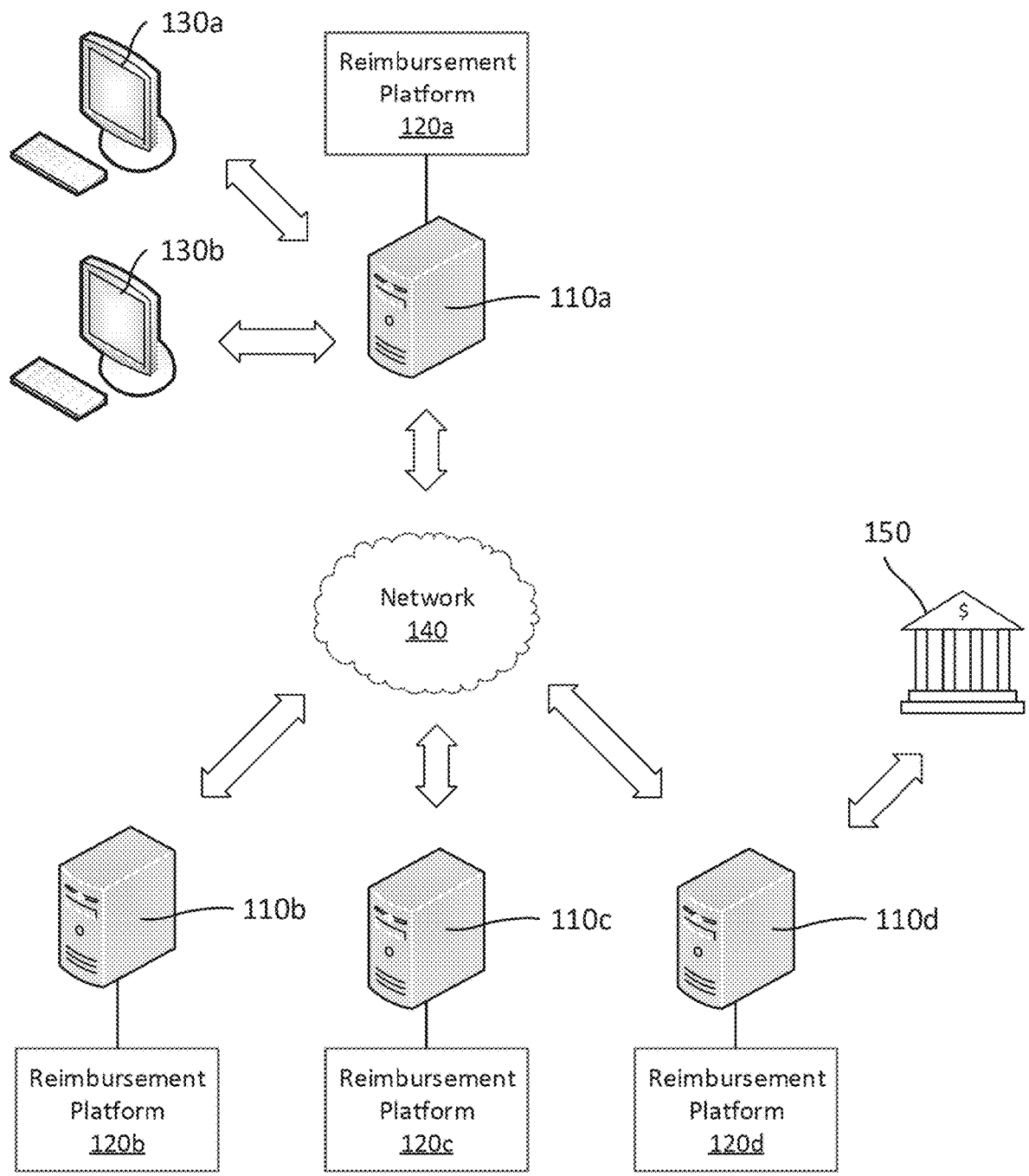
FIG. 1 is a diagram of an example system for facilitating reimbursement and reconciliation of pharmacy-related transactions according to some embodiments.

An example system 100 for facilitating reimbursement and reconciliation of pharmacy-related transactions is shown in FIG. 1. The system 100 includes reimbursement platforms 120a-d, each maintained on a respective computing system 110a-d. The computing systems 110a-d are communicatively connected to one another through a communications network 140. In some cases, each computing system 110a-c can be maintained or otherwise associated with a respective retail pharmacy or PBM, and the computing system 110d can be maintained or otherwise associated with a payer.

In this example, the computing system 110a also is communicatively connected to client devices 130a and 130b. Each client device 130a and 130b includes a user interface, and users can interact with user interfaces in order to view data (e.g., data on computing system 110a and platform 120a), transmit data to other devices (e.g., to computing devices 110b-d and platforms 110b-d, or other client devices 130a and 130b), and issue commands (e.g., to the computing devices 110a-d and platforms 120a-d, or client devices 130a and 130b). A client device 130a and 130b can be any electronic device that is used by a user to view, process, transmit and receive data. Examples of client devices 130a and 130b include computers (such as desktop computers, notebook computers, server systems, etc.), mobile computing devices (such as cellular phones, smartphones, tablets, personal data assistants, notebook computers with networking capability), and other computing devices capable of transmitting and receiving data (e.g., to and from the computing system 110a or through the network 140). Client devices 130a and 130b can include devices that operate using one or more operating system (for example, Microsoft Windows, Apple OSX, Linux, Unix, Android, iOS, etc.) and/or architectures (for example, x86, PowerPC, ARM, etc.) In some implementations, one or more client devices 130a and 130b need not be located locally with respect to the rest of system 100, and one or more client devices 130a and 130b can be located in one or more remote physical locations.

In this example, the computing system 110d is communicatively connected to financial institution 150 (e.g., a computing system maintained or otherwise associated with a financial institution). Financial institutions include, for example, a bank or other institution where funds can be deposited, held, withdrawn, and/or transferred to others. The computing system 110d can send instructions to the financial institution 150 to conduct financial transactions with respect to a particular financial account (e.g., instructions to deposit, withdraw, and/or transfer funds to and from the payer's financial account).

In some implementations, a user can install a software application onto a client device 130a and 130b and/or computing systems 110a-d in order to facilitate performance of the tasks described herein. For example, in some cases, part of all of the reimbursement platforms 120a-d can be deployed onto each of the computing systems 110a-d through the installation of a software application.

Network 140 can be any communications network through which data can be transferred and shared. For example, network 140 can be a local area network (LAN) or a wide-area network (WAN), such as the Internet. Network 140 can be implemented using various networking interfaces, for instance wireless networking interfaces (such as Wi-Fi, Bluetooth, or infrared) or wired networking interfaces (such as Ethernet or serial connection). Network 140 also can include combinations of more than one network, and can be implemented using one or more networking interfaces.

The computing systems 110a-d are each illustrated as a single component, but in practice can be implemented on one or more computing devices. Each computing system 110a-d can be, for instance, a single computing device that is connected to network 140, and the platforms 120a-d can each be maintained and operated on the single respective computing device. In some implementations, each computing system 110a-d can include multiple computing devices that are connected to network 140, and platforms 120a-d can be maintained and operated on some or all of the computing devices. For instance, each computing system 110a-d can include several computing devices, and platforms 120a-d can each be distributive on one or more of these computing devices. In some implementations, one or more of the computing systems 110a-d need not be located locally to the rest of system 100, and portions of one or more computing systems 110a-d can be located in one or more remote physical locations.

Figure 2:
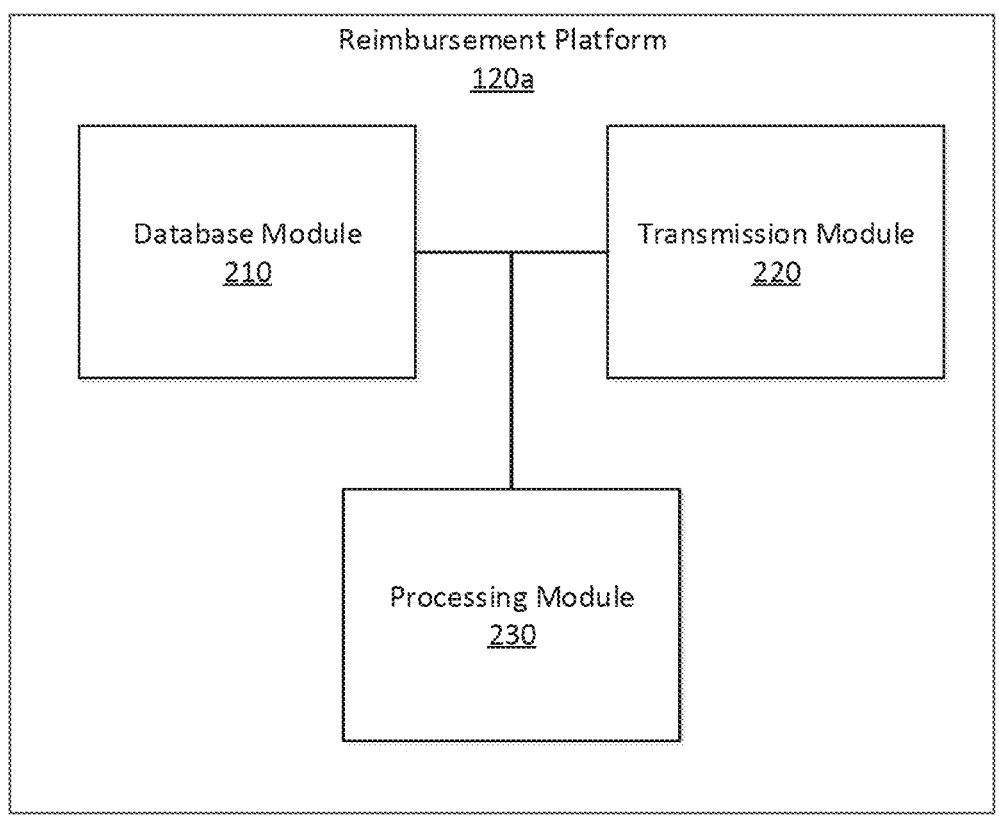
FIG. 2 is a diagram of an example reimbursement platform according to some embodiments.

In some implementations, each of the reimbursement platforms 120a-d can be substantially similar (e.g., implemented using similar hardware and/or software components installed in the computing systems 110a-d). As an illustrative example, FIG. 2 shows various aspects of the reimbursement platform 120a. The platform 120a includes several modules that perform particular functions related to the operation of the system 100. For instance, the platform 120a can include a database module 210, a transmission module 220, and a processing module 230.

The database module 210 maintains information related to one or more transactions. As example, the database module 210 can store information regarding transactions with respect to which a pharmacy seeks be reimbursed by a payer or has already reimbursed by a payer. This can include, for instance, information regarding the identity of a patient (e.g., the patient's name, address, telephone number, contact information, unique identifier, and so forth). This can also include an identity of a particular pharmacy where a patient fulfilled a prescription (e.g., the pharmacy's name, address, telephone number, contact information, username of an administrator, unique identifier, and so forth). This can also include information regarding the prescription that was fulfilled (e.g., a name of a medication, the type of the medication, the dosage or concentration of the medication, the number of units of the medication that was dispensed, the application instructions that were provided to the patient, the date that it was fulfilled, and so forth). This can also include information regarding a reimbursement claim (e.g., a name of an insurance carrier or payer associated with the patient, contact information regarding the insurance carrier or payer, an amount of money that was requested by the pharmacy, the amount of money that was paid by the insurance carrier or payer to the pharmacy, and so forth).

In some cases, information regarding the transactions is consolidated into a ledger. This ledger can include, for example, a record of each transaction that was conducted by the entities of the system 100. The ledger can include records for each prescription that was fulfilled by the pharmacies using the system 100, each reimbursement request that was submitted by those pharmacies, and a corresponding reimbursement received by the pharmacies from a payer. In some cases, the ledger is stored locally by a reimbursement platform 120a and synchronized with the ledgers stored in each of the other reimbursement platforms 120c-d, such that each reimbursement platform 120a-d maintains a consistent and complete ledger of each of the transactions conducted by the entities of the system 100. As example, the reimbursement platform 120a can retrieve a copy of a ledger from another reimbursement platform 120b-d, store a local copy of the ledger, update the local ledger to reflect reimbursement transactions, and periodically synchronize the ledger to ensure data consistency and completeness.

Although different examples of information are described above, these are merely illustrative. In practice, the database module 210 can store any information related to the platform 120a, either in addition to or instead of that described here.

Transmission module 220 allows for the transmission of data to and from platform 120a. For example, transmission module 220 can be communicatively connected to network 140, such that it can transmit data to and from client devices 130a and 130b. As an example, information inputted by users on client devices 130a and 130b can be transmitted to the platform 120a through the transmission module 220. This information can then be processed (e.g., using processing module 230) and/or stored (e.g., using database module 210). As another example, information from the platform 120a (e.g., information stored on database module 210) can be transmitted to one or more other computing systems (e.g., the computing systems 110b-d) through transmission module 220. In some cases, the transmission module 220 can be implemented using hardware (e.g., one or more transceivers, modems, network adapters, and other hardware) and/or software (e.g., computer instructions to control one or more hardware communications components).

Processing module 230 processes data stored or otherwise accessible to platform 120a. For instance, processing module 230 can execute automated or user-initiated processes that manipulate data pertaining to one or more transactions. As an example, processing module 230 can manipulate data stored on database module 210, or data that is received from transmission module 220. Likewise, processed data from processing module 230 can be stored on database module 210 and/or sent to transmission module 220 for transmission to other devices. In some cases, the processing module 230 can be implemented using hardware (e.g., one or more computer processors) and/or software (e.g., computer instructions to control one or more hardware processing components). Example processes that can be performed by processing module 230 are described in greater detail below.

As described above, one or more implementations of the system 100 can be used to facilitate transactions between a pharmacy, a pharmacy benefit manager, and/or a payer (e.g., to reimburse and reconcile transactions associated with the fulfillment of medical prescriptions). To illustrate, example reimbursement and reconciliation processes are described with respect to FIGS. 3A-H, FIGS. 6A-C, and FIGS. 7 and 8.

In the example shown in FIGS. 3A-H, the client devices 130a and 130b and the computing system 110a are associated with a retail pharmacy "A" that dispenses medications to patients. Similarly, the computing systems 110b and 110c are associated with a retail pharmacy "B" and a retail pharmacy "C," respectively. The computing system 110d is associated with a payer (e.g., a payer for an insurance carrier) that reimburses each of the retail pharmacies A, B, and C for the patients' purchases based on insurance policies held by the patients.

Figure 3A:
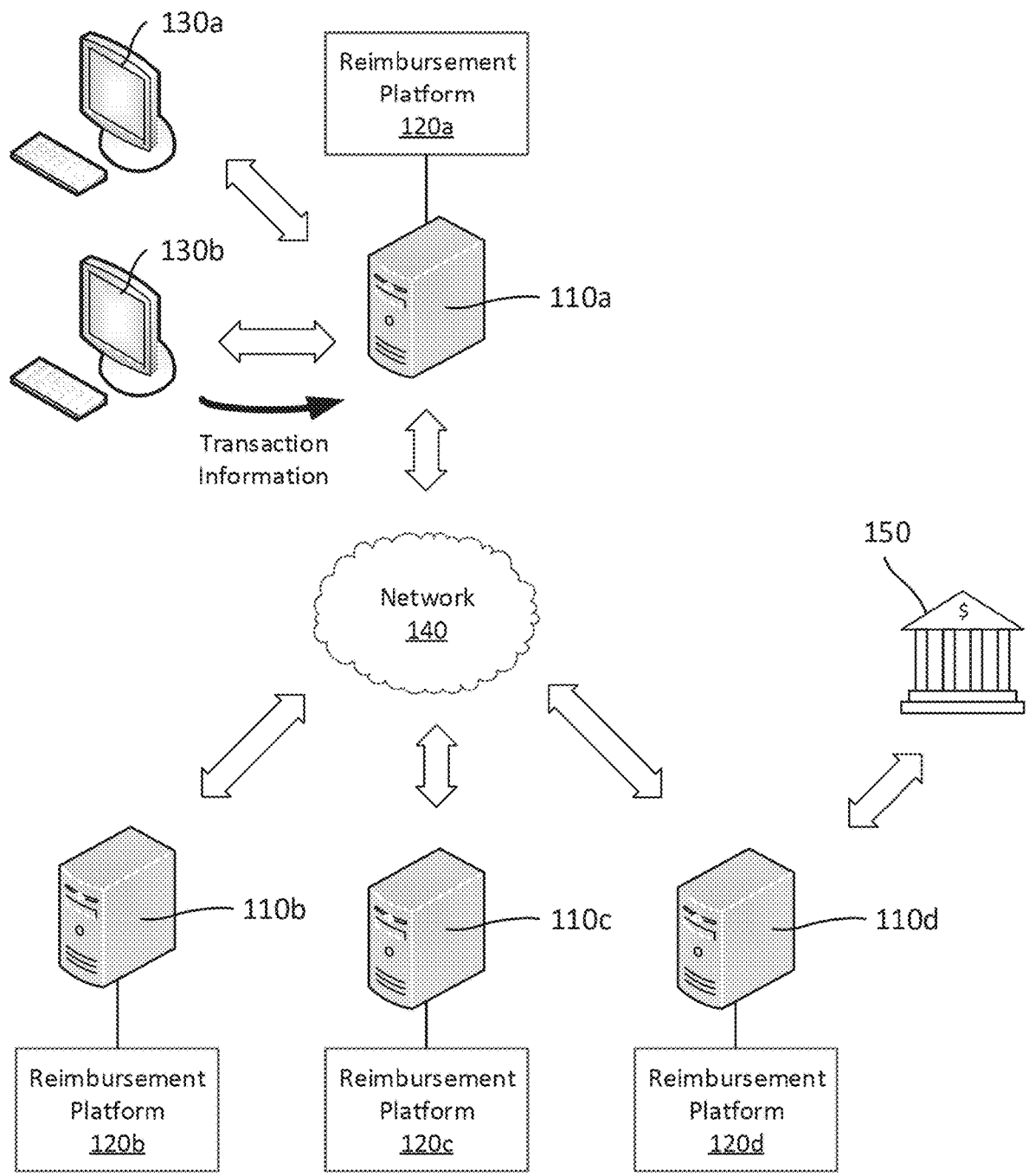
FIGS. 3A-H are diagrams depicting an example reimbursement process according to some embodiments.

As shown in FIG. 3A, a client device 130b transmits transaction information to the computing system 110a and the reimbursement platform 120a. The client device 130b can be a client device operated by the retail pharmacy to conduct a transaction with a patient. As an example, the client device 130b can be a point of sale device that a representative of the retail pharmacy (e.g., a pharmacist) operates to process a patient's prescription and dispense the prescribed medication. As another example, the client device 130b can be a device that a representative of the retail pharmacy (e.g., a financial administrator) operates to maintain records of the prescriptions fulfilled by the pharmacy and the reimbursement claims associated with those prescription. In some cases, the client device 130b can automatically transmit transaction information to the computing system 110a (e.g., automatically after a transaction has been conducted with a patient). In some cases, the client device 130b can transmit transaction information in response to a manual user command.

Transaction information can include any information that describes the nature of the transaction. For example, transaction information can include an identity of the patient (e.g., the patient's name, address, telephone number, contact information, unique identifier, and so forth). Transaction information can include information regarding the prescription that was fulfilled (e.g., a name of a medication, the type of the medication, the dosage or concentration of the medication, the number of units of the medication that was dispensed, the application instructions that were provided to the patient, the date that it was fulfilled, and so forth). Transaction information can also include information regarding the patient's insurance carrier or payer (e.g., a name of an insurance carrier or payer associated with the patient, contact information regarding the insurance carrier or payer, an account number of identifier of the patient issued by the insurance carrier or payer, the insurance policy held by the patient, and so forth).

Figure 3B:
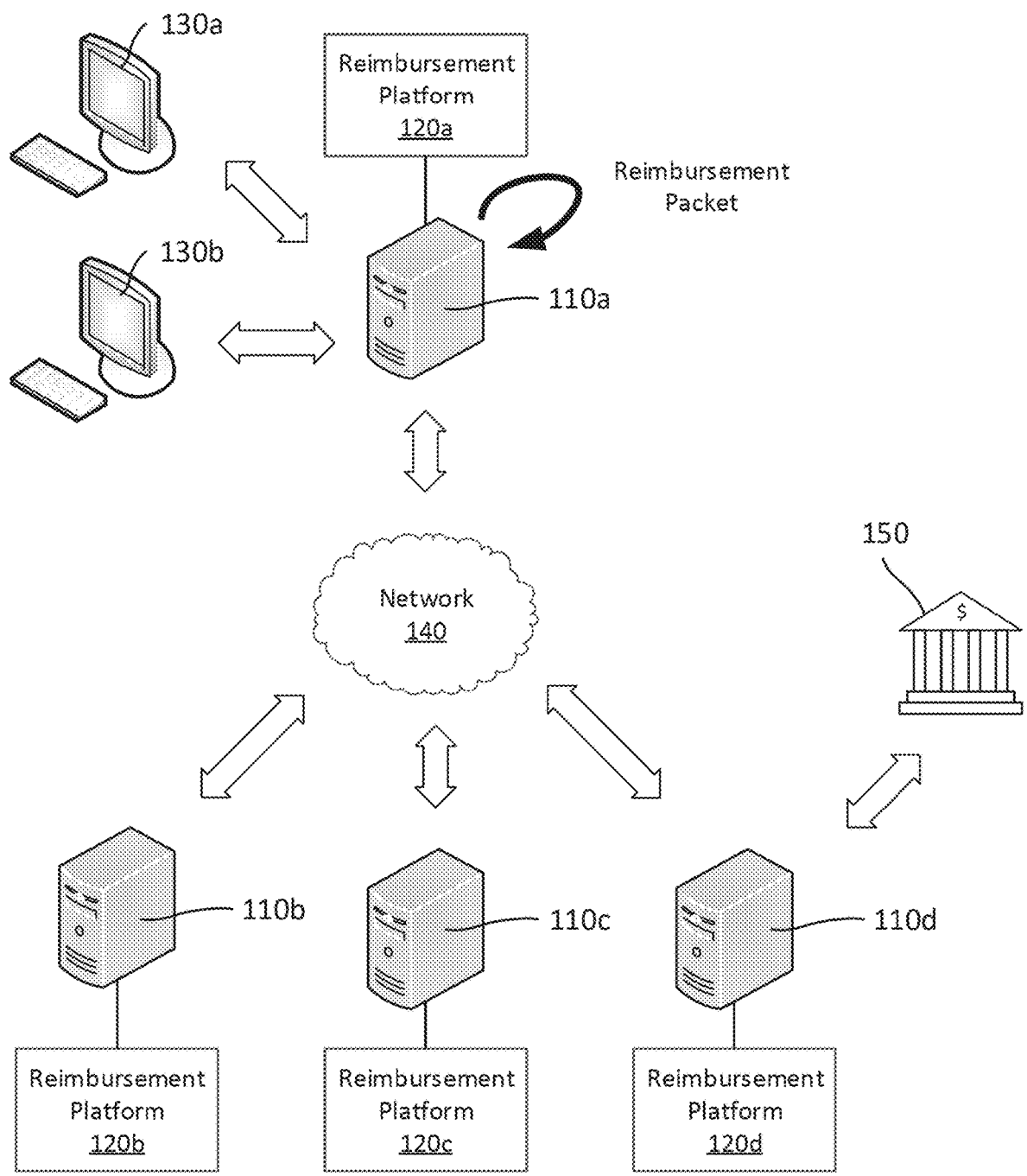

As shown in FIG. 3B, the computing system 110a (via the reimbursement platform 120a) receives the transaction information from the client device 130b, and creates a reimbursement packet. In some cases, the reimbursement packet can take the form of a data structure (e.g., a structured record, array, or other data item) having a particular arrangement of fields or records for storing data.

The reimbursement packet includes information that is used to process a reimbursement claim with a payer. This packet can include, for instance, information regarding the identity of the patient (e.g., the patient's name, address, telephone number, contact information, unique identifier, and so forth). This packet also can include information regarding the identity of the pharmacy A (e.g., the pharmacy's name, address, telephone number, contact information, username of an administrator, unique identifier, and so forth). This packet also can include information regarding the prescription that was fulfilled (e.g., a name of a medication, the type of the medication, the dosage or concentration of the medication, the number of units of the medication that was dispensed, the usage instructions that were provided to the patient, the date that it was fulfilled, and so forth). This packet also can include information regarding the patient's insurance carrier or payer (e.g., a name of an insurance carrier or payer associated with the patient, contact information regarding the insurance carrier or payer, an account number of identifier of the patient issued by the insurance carrier or payer, the insurance policy held by the patient, and so forth). This packet also can include information regarding a reimbursement claim (e.g., an amount of money being requested by the pharmacy, an account or policy against which the reimbursement is to be applied, and so forth). In some cases, the contents of the reconciliation packet can be determined based on the transaction information received from the client device 120b.

Figure 3C:
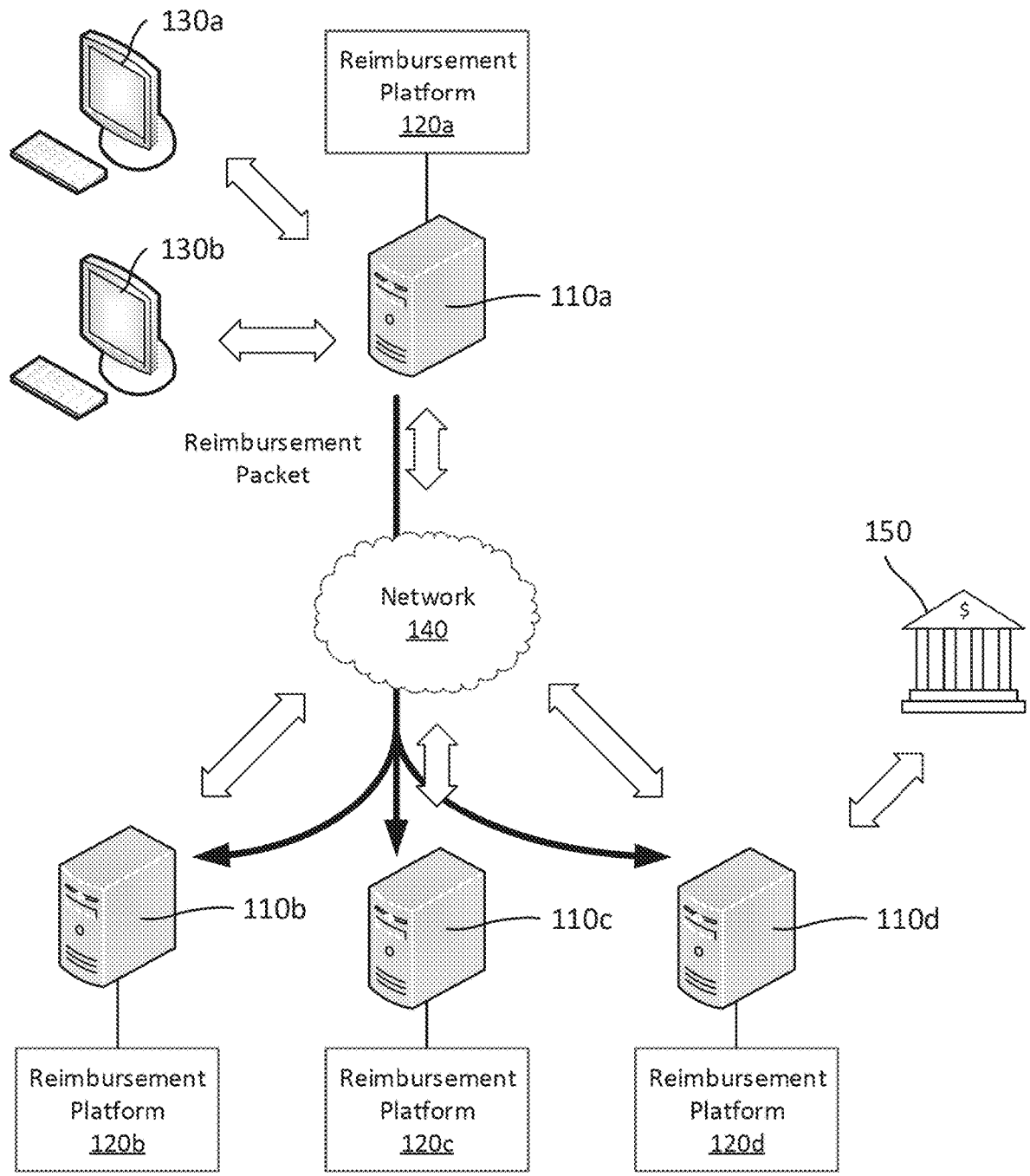

As shown in FIG. 3C, the computing system 110a transmits the reimbursement packet to each of the other computing systems 110b-d. As described above, the computing systems 110b and 110c are associated with different pharmacies B and C, respectively, and the computing systems 110d is associated with a payer. Thus, each of the other entities using the system 100 receives information regarding the prescription that was fulfilled by the pharmacy A and reimbursement sought by the pharmacy A.

In some cases, the computing system 110a identifies the other computing systems 110b-d based on a registry or directory that lists each of the computing systems of the system 100. As an example, a registry or directory can be maintained one or more the computing systems 110b-d (or on a separate computing system) that includes the identity and location (e.g., network address) of each computing system 110b-d. The computing system 110a can retrieve the registry or directory to ascertain a "map" of the system 100. The computing system 110a can then utilize the map to transmit information to each of the computing systems 110b-d.

Figure 3D:
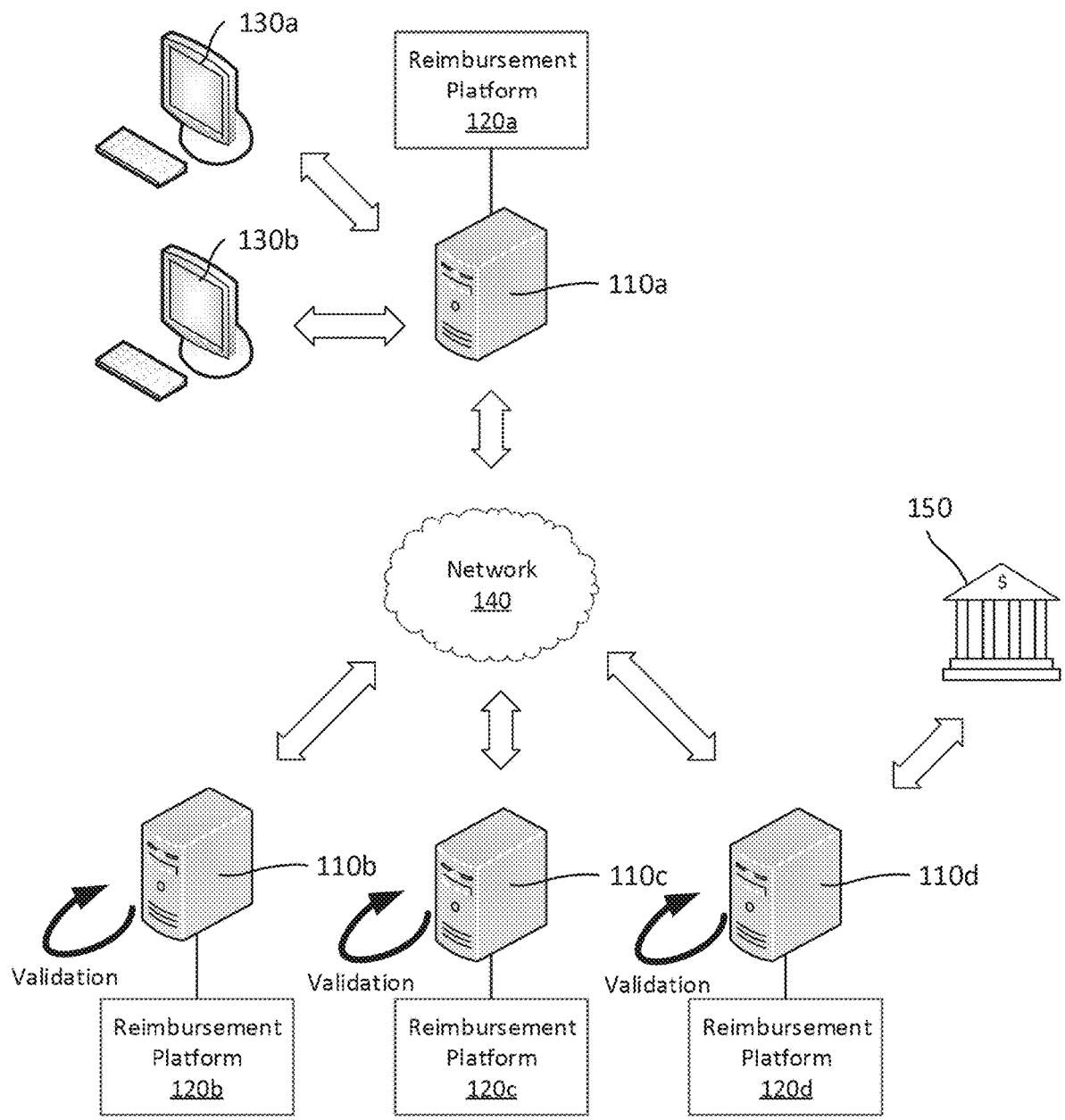

As shown in FIG. 3D, each of the computing systems 110b-d (via a respective reimbursement platform 120b-d) validates the reimbursement packet received from the computing system 110a. This validation process can be performed automatically (e.g., automatically upon receipt of a reimbursement packet) or manually (e.g., in response to a manual user command).

A reimbursement packet can be validated based on various criteria. As an example, a reimbursement packet can be validated, at least in part, based on the amount of money sought in the reimbursement claim. For instance, each computing system 110b-d can determine an amount of money or a range of amounts that is expected for the reimbursement based on the type of medication dispensed, the amount of medication dispensed, the patient's insurance policy, and so forth. If the amount of money sought in the reimbursement claim deviates from the expected amount or range, the computing system 110b-d can determine that the reimbursement claim is invalid. The expected amount or range of amounts can be determined, for example, based on information provided by the insurance carrier or payer to each of the pharmacies A-C. This can be beneficial, for example, in identifying reimbursement claims that are too high or too low (e.g., due to mistake or fraud).

As another example, a reimbursement packet can be validated, at least in part, based on the prescription being fulfilled. For instance, each computing system 110b-d can determine an amount of medication or range of amounts that is expected to be prescribed for a particular type of medication. If the amount being prescribed deviates from the expected amount or range of amounts, the computing system 120b-d can determine that the reimbursement claim is invalid. This can be beneficial, for example, in identifying reimbursement claims based on prescriptions that exceed accepted medical guidelines or other restrictions (e.g., due to mistake or fraud).

As a further example, each computing system 110b-d can determine whether a particular type of medication is still actively prescribed by physicians (e.g., whether the medication is obsolete and/or phased out of the market). If the medication being prescribed is no longer actively prescribed by physicians, the computing system 120b-d can determine that the reimbursement claim is invalid. A list of medications that are actively and/or not actively prescribed by physicians can be provided by the insurance carrier or payer to each of the pharmacies A-C. This can be beneficial, for example, in identifying reimbursement claims based on prescriptions that deviate from commonly accepted medical practice (e.g., due to mistake or fraud).

As another example, a reimbursement packet can be validated, at least in part, based on the relative amount of a particular type of medication is being dispensed. For example, each computing system 110b-d can determine an amount of a particular type of medication is being dispensed by the pharmacy A. If the amount being dispensed is disproportionately higher than the amount being dispensed by each of the other pharmacies B and C, the computing system 120b-d can determine that the reimbursement claim is invalid. In some cases, this determination can be made based on a ledger that describes each of the transactions conducted on the system 100. For example, the computing system 120b-d can determine the amount of a particular medication that was prescribed by the pharmacy A over a period of time, and compare the amount to that prescribed by the pharmacies B and C over the same period of time. If the amount dispensed by pharmacy A is disproportionately high, the computing systems 102b-d can determine that the reimbursement claim is invalid. This can be beneficial, for example, in identifying pharmacies that over-dispense certain medications (e.g., highly controlled medications, such as certain opioids or simulants).

Although example validation criteria are described herein, these are merely illustrative examples. Other validation criteria can also be considered in validating a reimbursement packet, either in addition to or instead of those described herein.

Figure 3E:
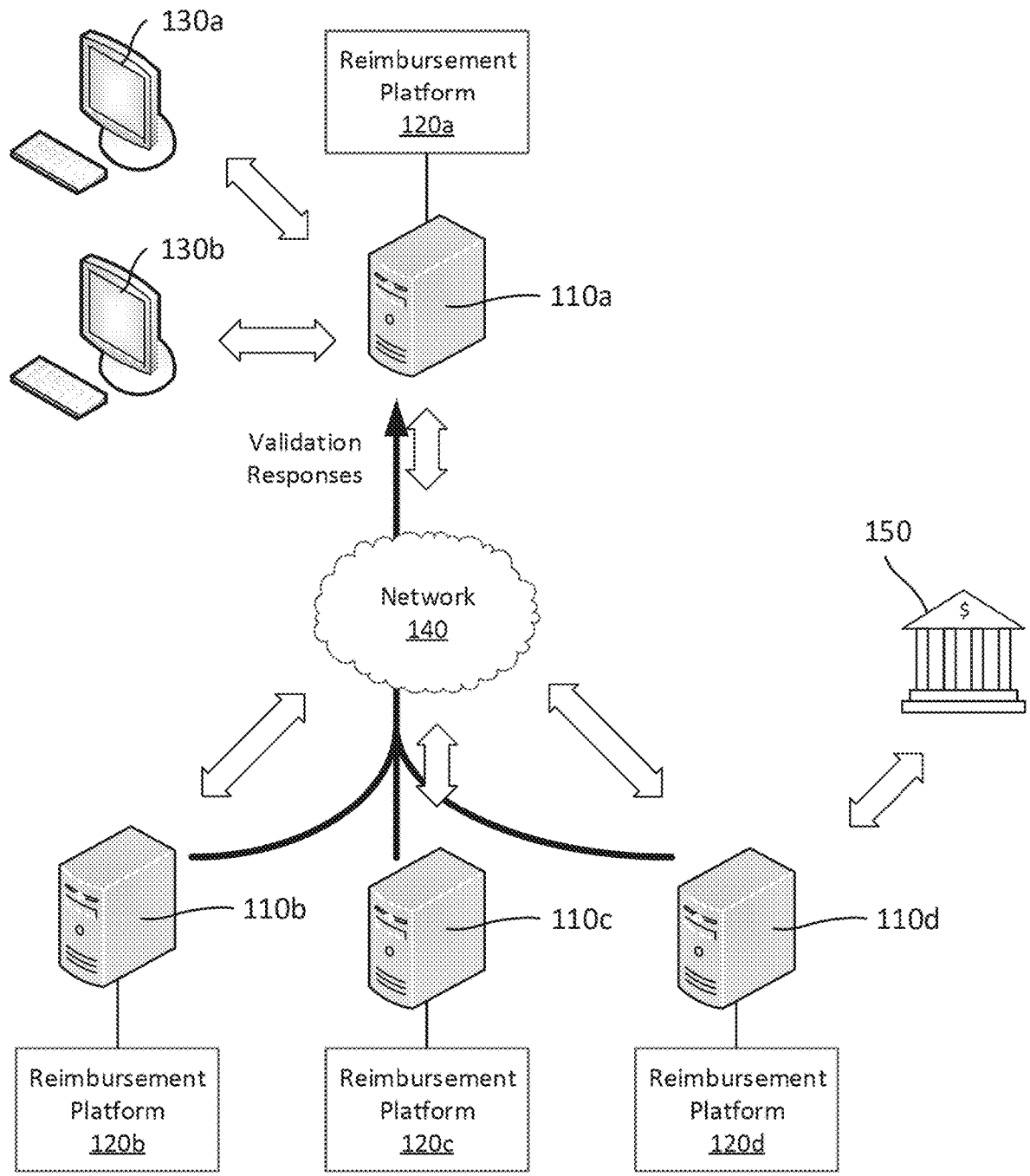

As shown in FIG. 3E, each of the computing systems 120c-d transmits a response to the reimbursement packet back to the computing system 110a. In some cases, the response can include a copy of the reimbursement packet (or an identifier associated with the reimbursement packet), and an indication whether the reimbursement packet contains information regarding a valid reimbursement claim. The indication can be, for example, a binary indicator (e.g., "yes" or "no," or "valid" or "invalid"). In some cases, the indication can include a confidence level indicating an estimated likelihood that the reimbursement claim is valid or invalid (e.g., in the form of a percent or fraction).

The computing system 110a (via the reimbursement platform 120a) receives the response from each of the computing systems 110b-d, and determines whether the reimbursement claim is valid. Various techniques can be used to reconcile the responses from each of the computing systems 110b-d. For example, in some cases, the computing system 110a determines that the reimbursement claim is valid if all of the other computing systems 110b-d indicate that it is valid. In some cases, the computing system 110a determines that the reimbursement claim is valid if a certain percentage or number of the other computing systems 110b-d indicates that it is valid. In some cases, the computing system 110a determines that the reimbursement claim is valid if none of the other computing systems 110b-d indicates that is invalid. Other criteria also can be used, depending on the implementation.

Figure 3F:
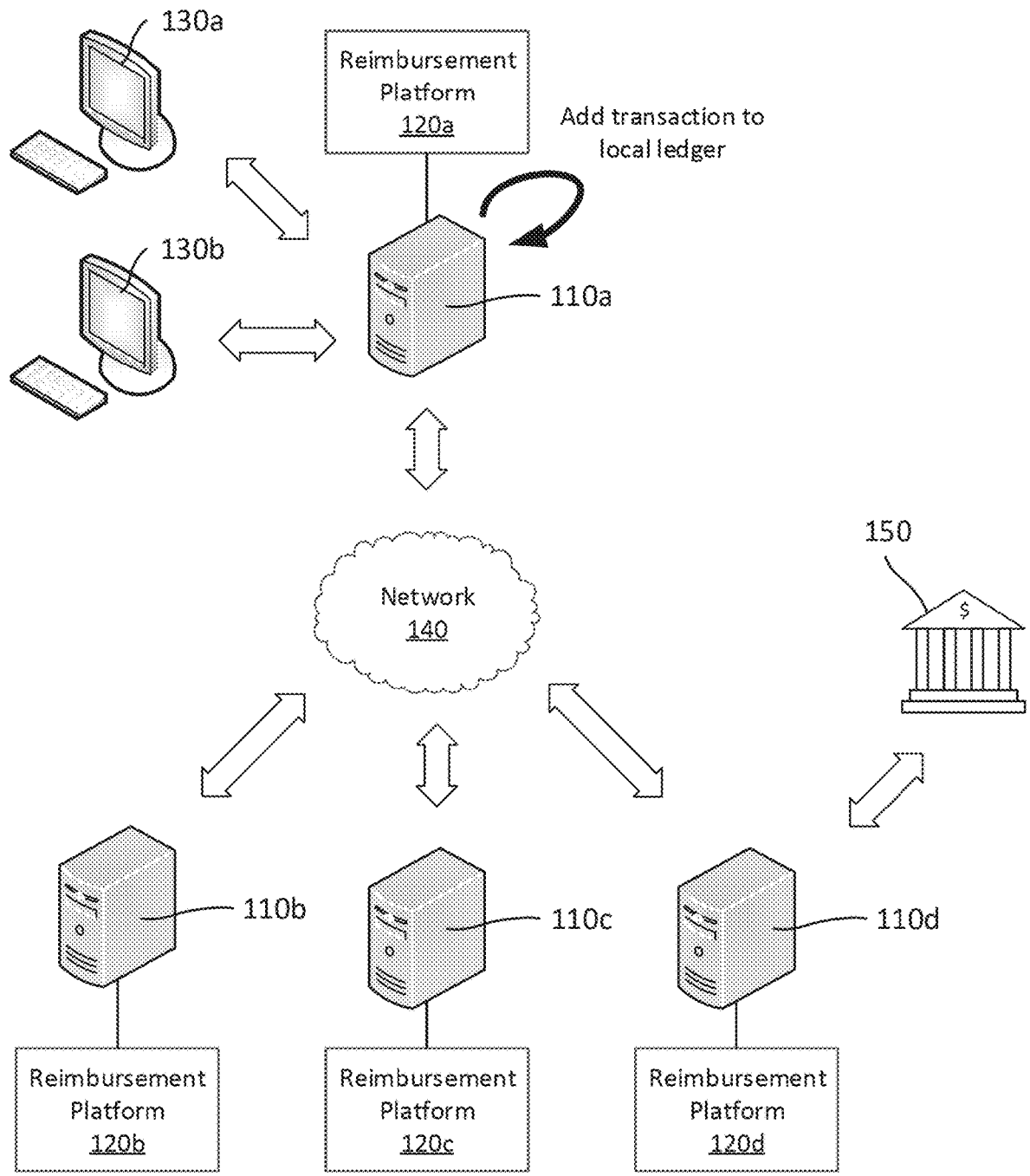

As shown in FIG. 3F, if the computing system 110a (via the reimbursement platform 120a) determines that the reimbursement claim is valid, the computing system 110a adds the reimbursement transaction to a ledger. As described herein, the ledger is stored locally by the computing system 110a, and describes each transaction that was conducted by the entities of the system 100 (e.g., reimbursement transactions conducted by each of the pharmacies A, B, and C with respect to the payer). Thus, the ledger stored by the computing system 110a is updated to include the latest reimbursement claim made by the pharmacy A.

Figure 3G:
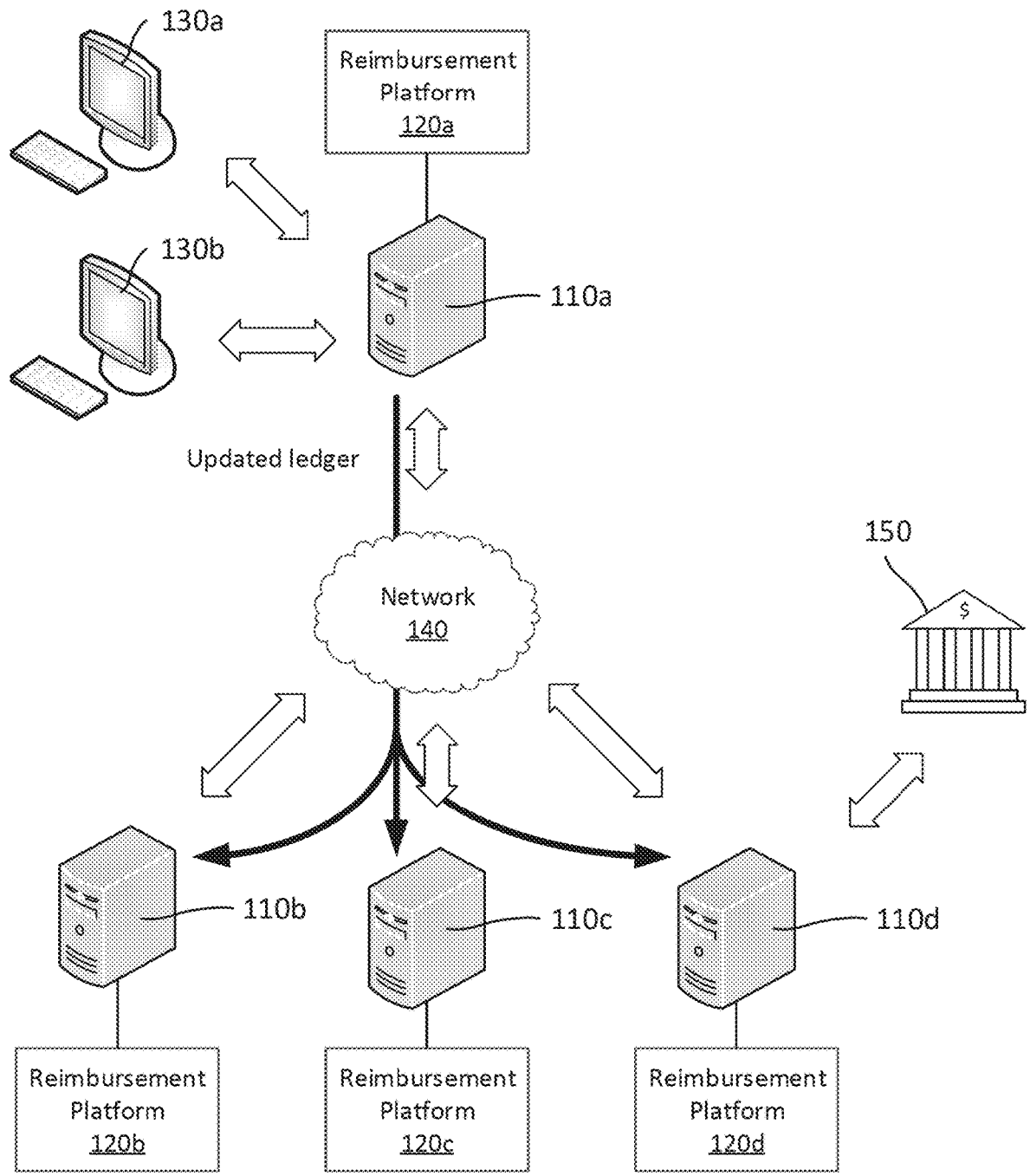

As described herein, in some cases, the ledger can be stored locally by a reimbursement platform 120a, and synchronized with the ledgers stored in each of the other reimbursement platforms 120c-d, such that each reimbursement platform 120a-d maintains a consistent and complete ledger of each of the transactions conducted by the entities of the system 100. For example, as shown in FIG. 3G, the computing system 110a (via the reimbursement platform 120a) can transmit a copy of the updated ledger to each of the other computing systems 110b-d, such that each of the entities of the system 100 have a current copy of the ledger. In some cases, the computing system 110a transmits the entire ledger (e.g., a complete and comprehensive ledger, including records for each and every reimbursement transaction conducted on the system 100). In some cases, the computing system 110a can transmit a portion of the ledger (e.g., a portion of the ledger containing new or recent reimbursement transactions). In response, each of the other computing systems 110b-d can update its own ledger based on the information. Thus, information regarding the transactions conducted on the system 100 is synchronized across each of the computing systems 110a-d.

In some cases, before transmitting a portion of the ledger (e.g., a portion of the ledger containing new or recent reimbursement transactions), the computing system 110a cryptographically "signs" that portion (e.g., using a private cryptographic key that can be verified through a corresponding public cryptographic key). Thus, each portion or "block" that is transmitted can be attributed to the computing system 110a. Similarly, as each of the other computing systems 110b-d transmits its own respective portion or "blocks" of the ledger, each of those portions of "blocks" are likewise attributed to a particular computing system. As such, each computing system 110a-d has a consistent and current ledger, and can attribute specific reimbursement transactions to specific computing systems (and corresponding entities) of the system 100.

Figure 3H:
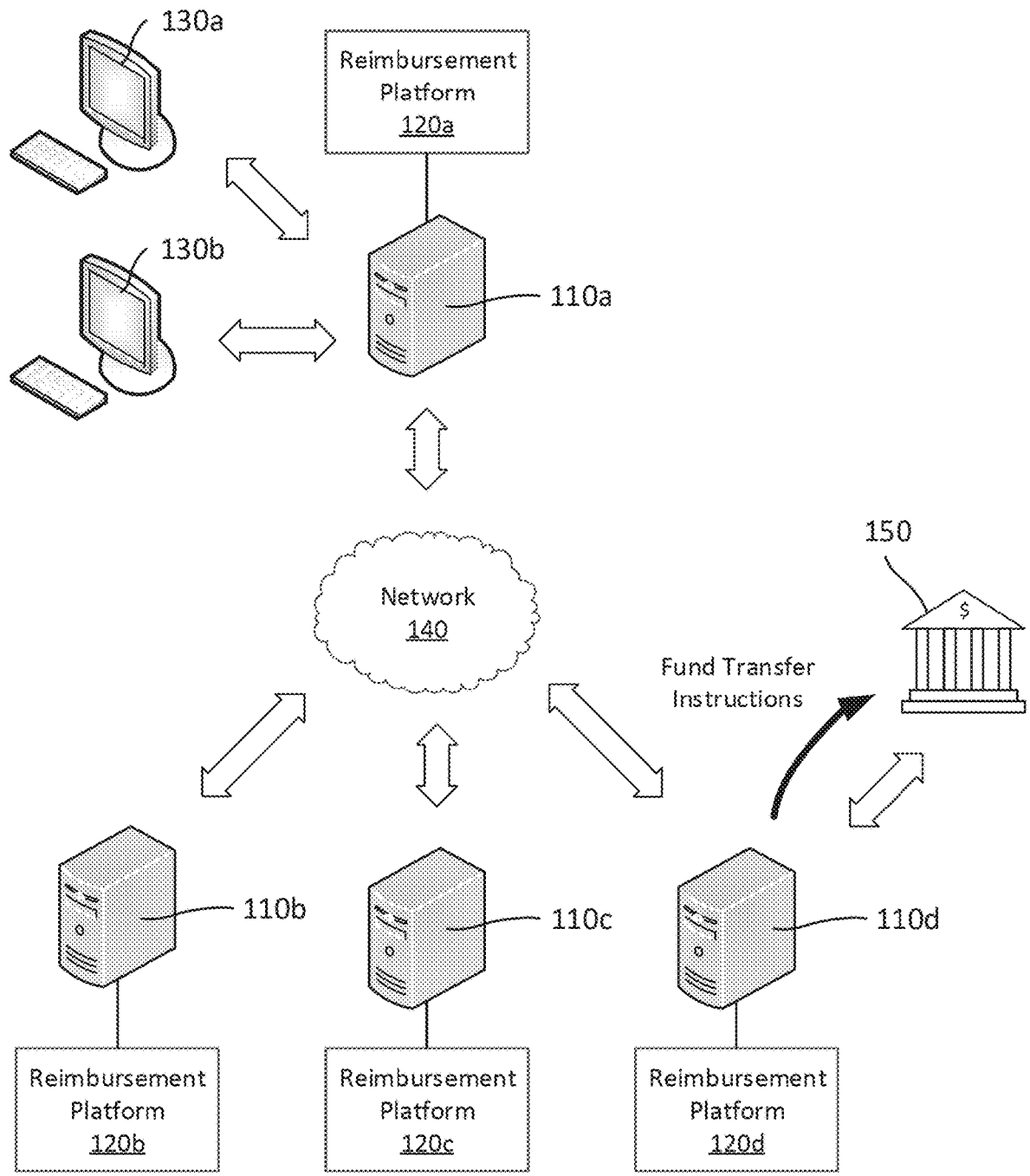

In this example, the computing system 110d is associated with a payer (e.g., a payer for an insurance carrier) that reimburses each of the retail pharmacies A, B, and C for the patients' purchases based on insurance policies held by the patients. As shown in FIG. 3H, when the computing system 110d receives the updated ledger from the computing system 110a, the computing system 110d instructs a financial institution 150 to transfer funds from the payer's financial account to pharmacy A's financial account for the validated reimbursement amount (e.g., through a wire transfer, an electronic funds transfer, or a physical check). Thus, the pharmacy A is reimbursed quickly and efficiency for dispensing the medication to the patient.

Although three pharmacies A, B, and C are a single payer are described with respect to FIGS. 3A-H, this is merely an illustrative example. In practice, a system can include any number of pharmacies, PBMs, and/or payers, depending on the implementation.

In some cases, fund transfers can be managed by a broker or other entity on behalf of a payer. For example, in some implementations, the computing system 110d can be operated by a broker (instead of a payer). When the computing system 110d receives an updated ledger from the computing system 110a, the computing system 110d can instruct a payer (e.g., a computing system operated by a payer) to transfer funds from the payer's financial account to pharmacy A's financial account for the validated reimbursement amount. In turn, the payer can process the fund transfer (e.g., by instructing its financial institution to conduct a wire transfer, conduct an electronic funds transfer, or generate a physical check for the appropriate amount). In some cases, the broker can handle transactions between multiple different pharmacies and/or payers. This can be useful, for example, as a broker can facilitate transactions between multiple different parties, making it easier or more convenient for parties to participate in the reimbursement process.

In the examples described herein, a fund transfer is initiated when a broker or payer receives an updated ledger containing information regarding a validated reimbursement claim. In some cases, however, a fund transfer can be initiated upon receipt of a separate instruction from the computing system 110a. As an example, the computing system 110a can transmit an updated ledger to each of the other entities in the system 100. However, in this example, fund transfers are initiated only when a separate fund transfer instruction is transmitted from the computing system 110a to the computing system 110d. This can be useful, for example, if the pharmacy A wishes to manually control when it wishes to submit reimbursement claims and/or the frequency by which such claims are submitted. For instance, in some cases, a pharmacy can submit reimbursement claims to the computing system 110d (e.g., a payer or a broker) according to a particular periodic schedule (e.g., weekly, monthly, quarterly, yearly, or according to some other schedule).

In some cases, the ledger can provide a basis for a virtual "currency" between each of the parties. For instance, based on the ledger, each of the parties can identify the transactions that have occurred between entities, the transactions that have been validated but not yet approved (e.g., validated imbursement claims), and the amount of money that is owed between them. The relative balance of each entity can thus be considered a virtual currency that can be redeemed for actual funds (e.g., money). As an example, if the pharmacy A obtains validated a reimbursement claim for a particular amount of money, that claim is added to pharmacy A's ledger, and the updated ledger is distributed to each of the entities of the system 100. Based on the updated ledger, each of the entities of the system 100 ascertains that the pharmacy A is owed a particular amount of money by a payer or broker, and thus has a positive balance of virtual currency in the amount of the claim. The pharmacy A can "redeem" this virtual currency by sending a redemption instruction to the payer or broker. The payer or broker ascertains that the pharmacy A has a positive balance of the virtual currency, and initials a transfer of money to the pharmacy A. In addition, the payer or broker adds a corresponding transaction to the ledger, deducting the redeemed amount (e.g., transferring the virtual currency or balance from the pharmacy A or the payer or broker). This can be beneficial, for example, as it allows entities to retain balances of a virtual currency, and redeem the balance for money at their discretion.

Implementations of this system can provide various benefits. As an example, as the validation process is distributed across multiple different entities, the validation and reimbursement process is more transparent and understandable to each of the entities. For instance, each pharmacy has access to the criteria by which reimbursement claims are validated, and can themselves validate reimbursement claims made by others using the same criteria. Further, as each entity maintains a ledger of each of the reimbursement transactions performed on the system 100, each entity is able to independently analyze the reimbursement activity of others. This is beneficial, for example, as it can reduce the amount of fraud, unfair practices, or uncompetitive behavior between each of the parties (which might otherwise be hidden from scrutiny).

Further, as each of the reimbursement claims are validated in a substantially automated manner, the reimbursement process can be performed relatively quickly (e.g., on the order of seconds, minutes, or hours). Thus, the parties can reconcile their transactions and/or receive reimbursements quickly and efficiently.

Further, as the reimbursement process is distributed across multiple different computing systems (e.g., across multiple computing systems operated by multiple different pharmacies, PBMs, payers, and/or brokers), the system is highly decentralized. As such, the system is less susceptible to localized points of failure (e.g., failures of an isolated number of computer systems or the network connectivity between them), and is more likely to remain functional despite adverse conditions. Similarly, as a copy of the ledger is maintained across multiple computing systems, the need to backup individual computing systems is reduced, as the system can continue to function even when one or more individual computing systems are disrupted.

Further, entities can freely join and leave the reimbursement system (e.g., by joining as additional "nodes" in the system to validate reimbursement claims and submit their own reimbursement). Thus, the system is highly flexible and scalable, and can readily accommodate any number of participants, and any combination of participants.

Further still, the system enables users to exchange information in a secure manner (e.g., via encrypted transmissions between computing systems), such that sensitive data (e.g., financial or medication information) is less likely to be intercepted by unauthorized parties. Similarly, the system also enables users to exchange money in a secure manner, such that money is less likely to be stolen or misrouted by unauthorized parties.

Further still, the system can be implemented over a variety of different computing networks, including the Internet. Thus, in some cases, the system can be deployed, maintained, and expanded without significant additional infrastructure.

Further still, the system enables its users to collect longitudinal data regarding one or more entities associated with the system. For instance, as implementations of the system maintain complete (or substantially complete) records of the transactions conducted using the system, users of the system can collect and analyze data to determine overall market trends (e.g., overall prescription trends of doctors, overall market share of pharmacies, overall patient health for a population, and so forth), as well as individualized trends (e.g., the prescription trends of individual doctors, the market share of particular pharmacies, the medical histories of specific patients, and so forth).

In some cases, an employer can use the system to obtain information regarding each of its employees. This can be beneficial, for example, as it allows the employer to better understand the health of its employees. Further, it also allows employers to quickly and efficiently obtain information regarding new employees (e.g., new hires), and understand each new employee's impact on the employer's medical benefits policies.

Figure 4:
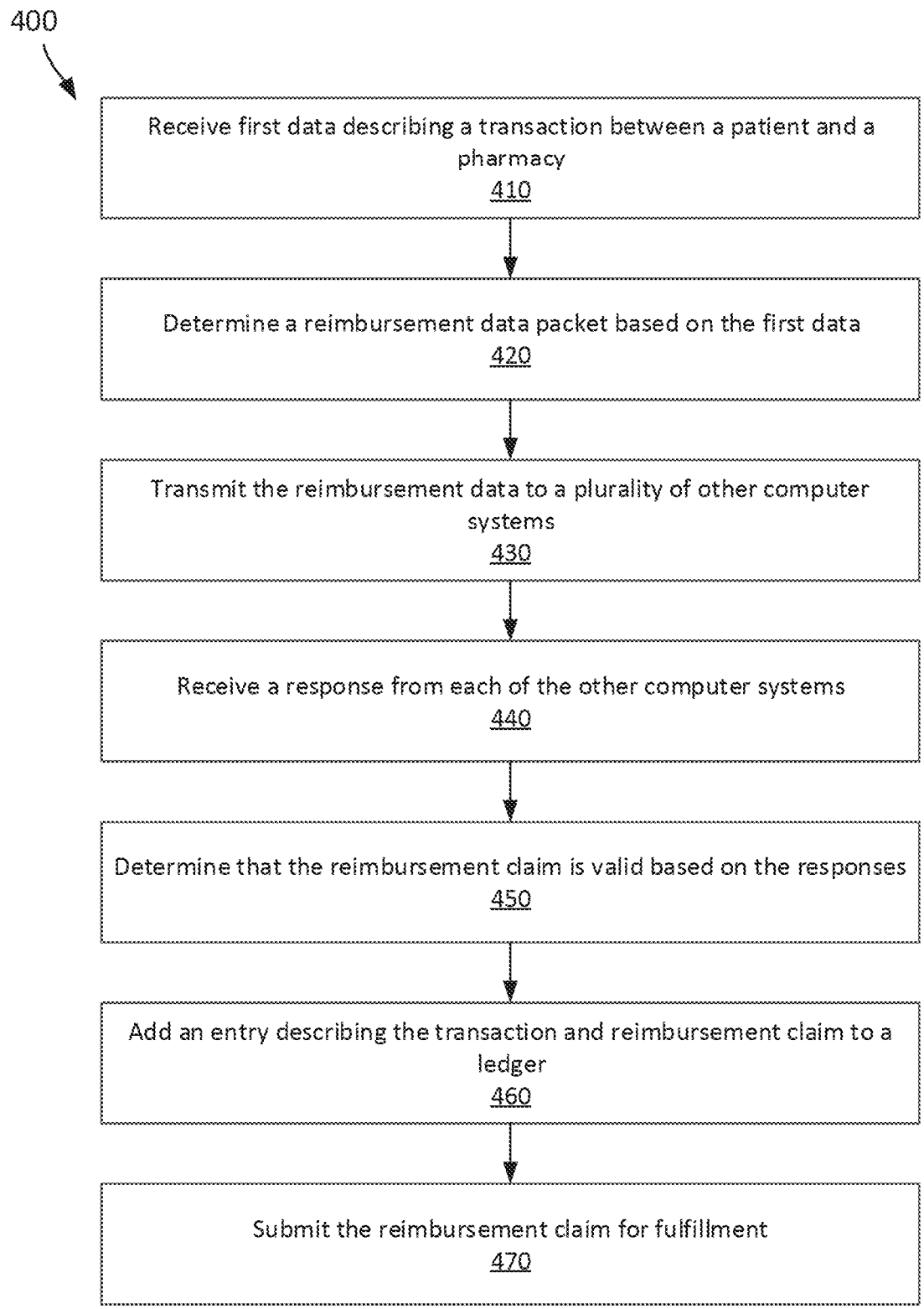
FIG. 4 is a flow chart diagram of an example process of reimbursing pharmacy-related transactions according to some embodiments.

An example process 400 of reimbursing pharmacy-related transactions is shown in FIG. 4. Implementations of the process 400 can be performed, for example, by system 100.

First data describing a transaction between a patient and a pharmacy is received at a first computer system (step 410). As described herein, the transaction can include dispensing of a medication (e.g., a prescription medication). As an example, the first computer system can be implemented using the computing system 110a.

A reimbursement data packet is determined at the computer system based on the first data (step 420). As described herein, the reimbursement data packet can include second data describing a reimbursement claim to be submitted to a payer for the transaction.

The reimbursement data packet is transmitted from the first computer system to a plurality of other computer systems via a computer network (step 430). As an example, the reimbursement data packet can be transmitted over a network 140 to one or more computing systems 110b-d.

A response is received from each of the other computer systems via the computer network (step 440). As described herein, each response can indicate whether a respective one of the other computer systems determined that the reimbursement claim is valid. For example, each of the other computer systems can validate the reimbursement packet, and transmit the results of the validation to the computing system via a network (e.g., the network 140). This validation process can be performed automatically (e.g., automatically upon receipt of a reimbursement packet) or manually (e.g., in response to a manual user command).

As described herein, a reimbursement packet can be validated based on various criteria. As an example, a reimbursement packet can be validated, at least in part, based on the amount of money sought in the reimbursement claim. As another example, a reimbursement packet can be validated, at least in part, based on the prescription being fulfilled. As a further example, a reimbursement packet can be validated by determining whether the prescribed medication is still actively prescribed by physicians (e.g., whether the medication is obsolete and/or phased out of the market). As another example, a reimbursement packet can be validated, at least in part, based on the relative amount of a particular type of medication is being dispensed. Although example validation criteria are described herein, these are merely illustrative examples. Other validation criteria can also be considered in validating a reimbursement packet, either in addition to or instead of those described herein.

A determination is made at the first computer system that the reimbursement claim is valid based on the responses (step 460). As described herein, each of the other computer systems can individually validate the reimbursement packet, and individually transmit a response to the reimbursement packet back to the first computing system. The first computing system can receive the response from each of the other computer systems, and determine whether the reimbursement claim is valid. Various techniques can be used to reconcile the responses from each of the other computing systems. For example, in some cases, the first computer system can determine that the reimbursement claim is valid if all of the other computer systems indicate that it is valid. In some cases, the first computer system can determine that the reimbursement claim is valid if a certain percentage or number of the other computer systems indicate that it is valid. In some cases, the first computer system can determine that the reimbursement claim is valid if none of the other computer systems indicates that is invalid. Other criteria also can be used, depending on the implementation.

If the reimbursement claim is valid, an entry describing the transaction and reimbursement claim is added to a ledger (step 470). As described herein, the ledger can include a record of each transaction that was conducted by the entities of a reimbursement system. As an example, the ledger can include records for each prescription that was fulfilled by the pharmacies using the reimbursement system, each reimbursement request that was submitted by those pharmacies, and a corresponding reimbursement received by the pharmacies from a payer. In some cases, the ledger is stored locally by the first computer system, and synchronized with the ledgers stored in each of the other computer systems of the reimbursement system, such that each computer system maintains a consistent and complete ledger of each of the transactions conducted by the entities of the reimbursement system.

As described herein, in some implementations, the first computer system can transmit a portion of the ledger (e.g., a portion of the ledger containing new or recent reimbursement transactions). In response, each of the other computer systems can update its own ledger based on the information. Thus, information regarding the transactions conducted on the reimbursement system is synchronized across each of the computer systems. In some cases, before transmitting a portion of the ledger (e.g., a portion of the ledger containing new or recent reimbursement transactions), the first computer system can cryptographically "sign" that portion (e.g., using a private cryptographic key that can be verified through a corresponding public cryptographic key). Thus, each portion or "block" that is transmitted can be attributed to the first computing system. As such, each computer system has a consistent and current ledger, and can attribute specific reimbursement transactions to specific computer systems (and corresponding entities) of the reimbursement system.

Figure 5:
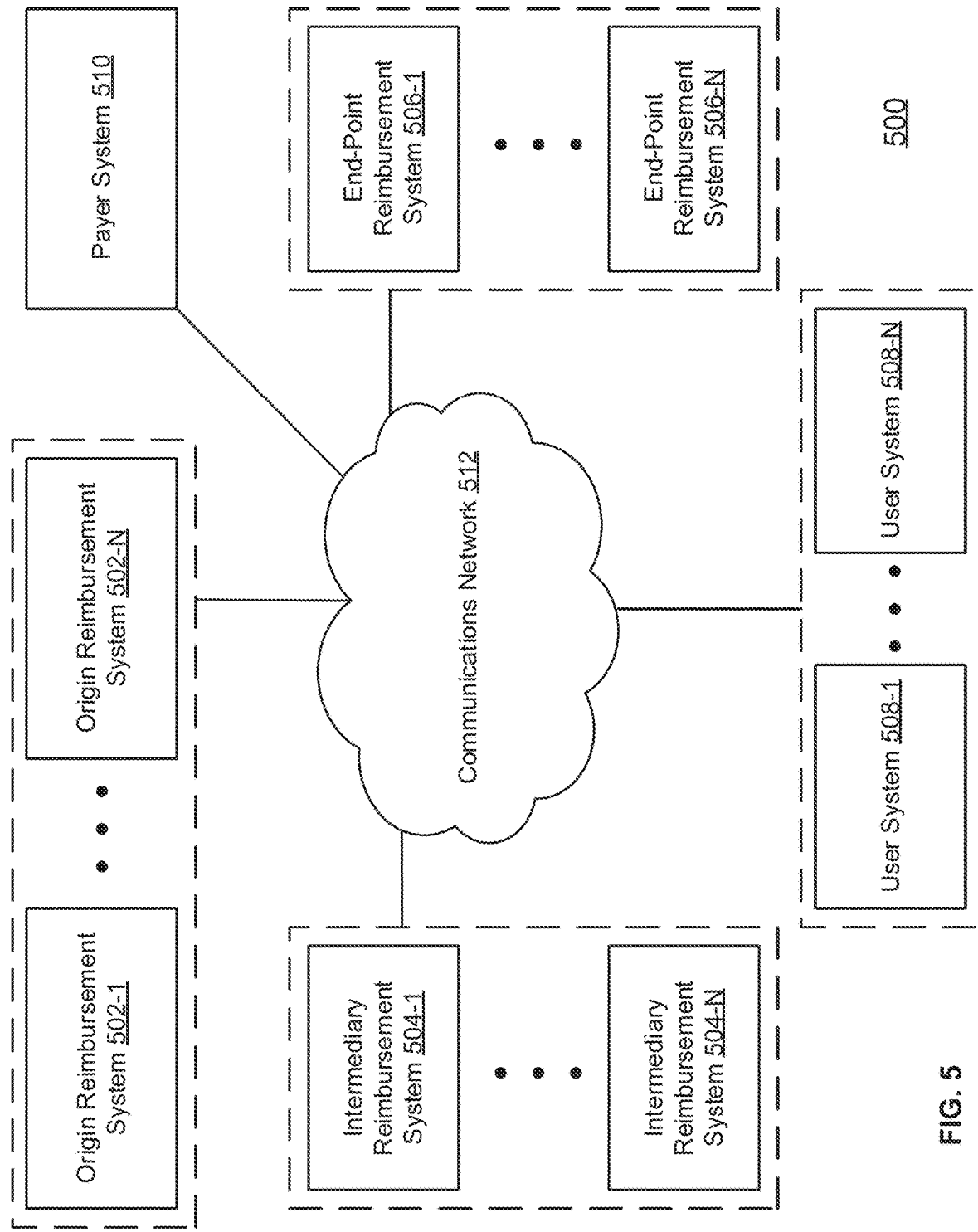
FIG. 5 depicts a diagram of an example system 500 for secure recordation, reimbursement and/or reconciliation of transactions according to some embodiments.

FIG. 5 depicts a diagram of an example system 500 for secure recordation, reimbursement and/or reconciliation of transactions according to some embodiments. In the example of FIG. 5, the system 500 includes origin reimbursement systems 502-1 to 502-N (individually, the origin reimbursement system 502, collectively, the origin reimbursement systems 502), intermediary reimbursement systems 504-1 to 504-N (individually, the intermediary reimbursement system 504, collectively, the intermediary reimbursement systems 504), end-point reimbursement systems 506-1 to 506-N (individually, the end-point reimbursement system 506, collectively, the end-point reimbursement systems 506), user systems 508-1 to 508-N (individually, the user system 508, collectively, the user systems 508), payer system 510, and communications network 512.

The origin reimbursement systems 502 may be configured to facilitate secure recording, reimbursement and/or reconciliation of transactions (e.g., pharmacy-related or other supply-chain transactions) between associated origin systems (e.g., a manufacturer systems) and one or more remote systems (e.g., wholesaler systems or other intermediary systems). For example, an origin reimbursement system 502 may be associated with a pharmaceutical manufacturer system. In some embodiments, each of the origin reimbursement systems 502 comprise a respective computing system (e.g., a computing system 110) implementing a corresponding reimbursement platform (e.g., a reimbursement platform 120).

In some embodiments, the origin reimbursement systems 502 may be configured to obtain transaction information for transactions between associated origin systems and one or more other systems (e.g., intermediary systems). For example, transaction information can include date and time of a transaction (e.g., a timestamp), type of product (e.g., pharmaceutical), quantity of product (e.g., batch size and/or number of batches), price of product, pharmaceutical interactions, adjudication information, and the like.

In some embodiments, the origin reimbursement systems 502 may be configured to generate reimbursement claims and transaction data packets. Transaction data packets may include reimbursement data packets and/or other transaction data packets describing one or more transactions between one or more of the systems 502-510. In various embodiments, the origin reimbursement systems 502 may be configured to validate transaction packets, validate reimbursement claims, add transactions to a ledger, and/or perform other functionality of the reimbursement systems and platforms described herein. In various embodiments, some or all of the ledgers and/or portions of the ledgers described herein are immutable. For example, when a transaction is added to a ledger in the form of a record or other entry, that record or entry may not be modified.

The intermediary reimbursement systems 504 may be configured to facilitate secure recording, reimbursement and/or reconciliation of transactions between associated intermediary systems (e.g., wholesaler systems) and one or more remote systems (e.g., origin systems, pharmacies or other end-point systems, and the like). For example, an intermediary reimbursement system 504 may be associated with a pharmaceutical wholesaler system. In some embodiments, each of the intermediary reimbursement systems 504 comprise a respective computing system (e.g., a computing system 110) implementing a corresponding reimbursement platform (e.g., a reimbursement platform 120).

In some embodiments, the intermediary reimbursement systems 504 may be configured to obtain transaction information for transactions between associated intermediary systems and one or more remote systems (e.g., origin systems and/or end-point systems). In various embodiments, the intermediary reimbursement systems 504 may be configured to validate transaction packets, validate reimbursement claims, add transactions to a ledger, and/or perform other functionality of the reimbursement systems and platforms described herein.

The end-point reimbursement systems 506 may be configured to facilitate secure recording, reimbursement and/or reconciliation of transactions between associated end-point systems (e.g., retail systems) and one or more remote systems (e.g., origin systems, intermediary systems, or user systems) and/or one or more users. For example, an end-point reimbursement system 506 may be associated with a pharmacy system. In some embodiments, each of the end-point reimbursement systems 506 comprise a respective computing system (e.g., a computing system 110) implementing a corresponding reimbursement platform (e.g., a reimbursement platform 120). In various embodiments, the end-point reimbursement systems 506 may be configured to validate transaction packets, validate reimbursement claims, add transactions to a ledger, and/or perform other functionality of the reimbursement systems and platforms described herein.

In some embodiments, the end-point reimbursement systems 506 may be configured to trigger parallel recording and/or payment for at least a portion of a validated reimbursement claim. An example method of parallel recording and/or payment is described below with reference to FIG. 7.

In some embodiments, the end-point reimbursement systems 506 may be configured to trigger linear recording and/or payment for at least a portion of a validated reimbursement claim. An example method of linear recording and/or payment is described below with reference to FIG. 8.

The user systems 508 may be configured to facilitate secure recordation, reimbursement and reconciliation of transactions between associated users and one or more remote systems (e.g., origin systems, intermediary systems, and/or end-point systems). For example, the user systems 508 may comprise a mobile device or other computing device associated with one or more users.

The payers system 510 may be associated with one or more payers (e.g., insurance carriers) and configured to provide payment to one or more computing systems (e.g., systems 502-510). The payer system 510 may instruct a financial institution to provide physical currency (e.g., wire transfer) and/or virtual currency to the one or more computing systems.

The communications network 512 may represent one or more computer networks (e.g., LAN, WAN, or the like) or other transmission mediums. The communication network 512 can provide communication between systems 502-510 and/or other systems described herein. In some embodiments, the communication network 512 comprises one or more computing devices, routers, cables, buses, and/or other network topologies (e.g., mesh, and the like). In some embodiments, the communication network 512 may be wired and/or wireless. In various embodiments, the communication network 512 may comprise the Internet, one or more wide area networks (WANs) or local area networks (LANs), one or more networks that may be public, private, IP-based, non-IP based, and so forth.

Figure 6A:
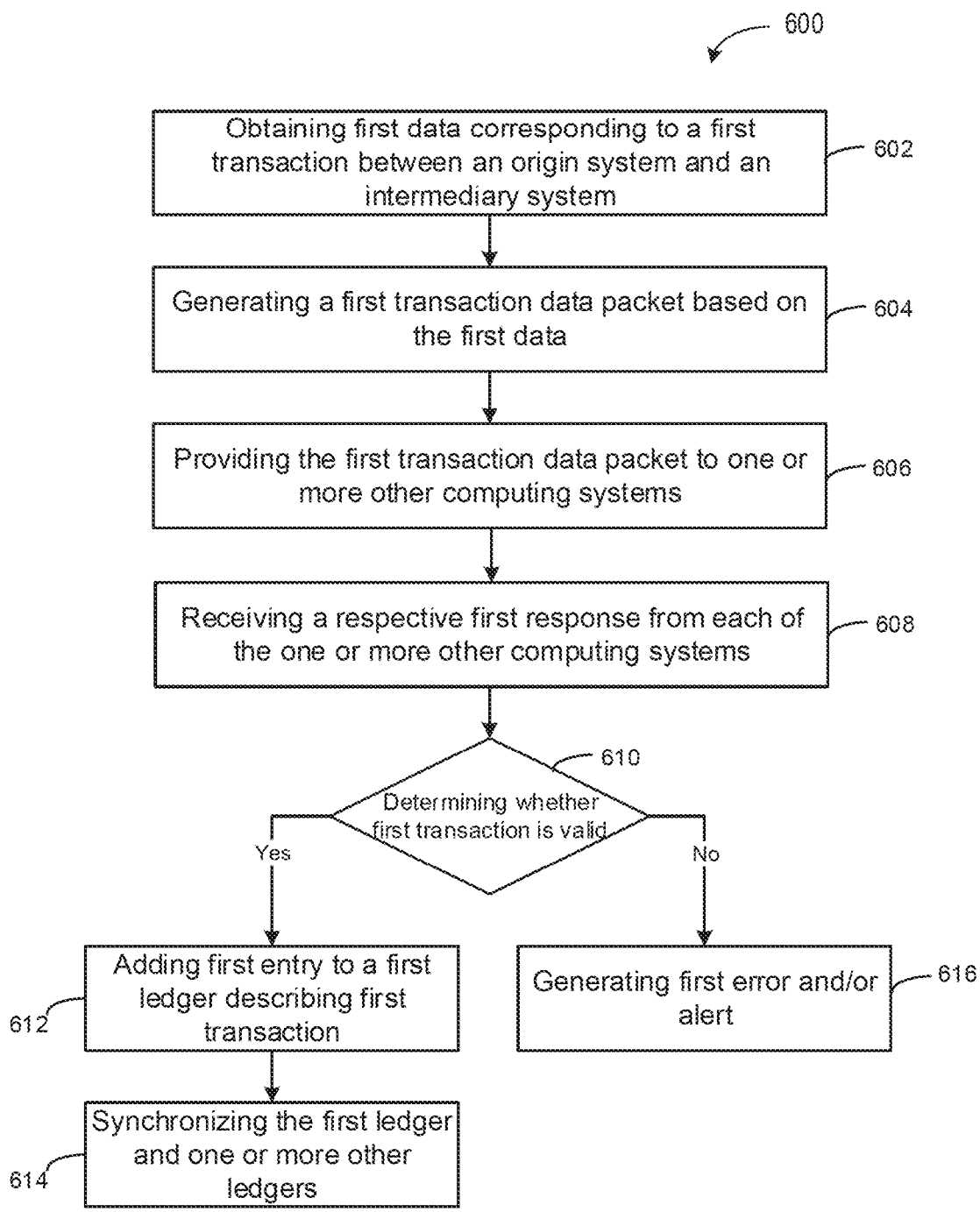
FIG. 6A depicts a flowchart of an example method of securely recording transactions between an origin system and an intermediary system according to some embodiments.

FIG. 6A depicts a flowchart 600 of an example method of securely recording transactions (e.g., pharmacy-related or other supply-chain transactions) between an origin system and an intermediary system according to some embodiments. In this and other flowcharts, the flowchart illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

In step 602, a first computing system obtains first data corresponding to a first transaction between an origin system and an intermediary system. For example, the first transaction can include a manufacturer system providing product (e.g., pharmaceuticals) to a wholesaler system, and the first data may include details of the transaction (e.g., date and time of transaction, type of product, quantity of product, price of product, pharmaceutical interactions, adjudication information, and the like). In some embodiments, an origin reimbursement system (e.g., origin reimbursement system 502) associated with the origin system obtains the first data.

In step 604, the first computing system generates a first transaction data packet based on the first data. In some embodiments, the origin reimbursement system generates the first transaction data packet. As described herein, the transaction data packet can include additional data describing the first transaction, such as details of the transaction, a reimbursement claim to be submitted to a payer system (e.g., payer system 510) for the transaction, and the like.

In step 606, the first computing system provides the first transaction data packet to one or more other computing systems (e.g., one or more origin reimbursement systems 502, intermediary reimbursement systems 504, and/or end-point reimbursement systems 506). In some embodiments, the origin computing system provides the first transaction data packet over a communications network (e.g., communications network 512).

In some embodiments, the first computing system provides the first transaction data packet to one or more selected other computing systems, e.g., selected origin reimbursement systems, selected intermediary reimbursement systems, selected end-point reimbursement systems, and/or a selected payer system. For example, the first computing system may select a subset of the other computer systems based on one or more rules. The rules may indicate a type of computing system that may be selected (e.g., an origin type, intermediary type, end-point type, payer type, and the like), a particular computing system (e.g., a known competitor or collaborator), and so forth.

In step 608, the first computing system receives a respective first response from each of the one or more other computing systems. As described herein, each response can indicate whether a respective one of the other computing systems determined that the first transaction is valid. For example, each of the other computing systems can validate the first transaction data packet, and provide the results of the validation to the first computing system via the communications network. This validation process can be performed automatically (e.g., automatically upon receipt of the first transaction data packet) or manually (e.g., in response to a manual user command). In some embodiments, the process for validating transaction data packets may be the same, or similar to, the process for validating reimbursement packets. In some embodiments, the origin reimbursement system receives the respective first response(s).

In some embodiments, the first computing system receives a respective first response from a selected subset of the one or more other computing systems or a selected subset of the one or more selected other computing systems. In various embodiments, the respective responses may be different although associated with the same result, e.g., valid or invalid. For example, two different computing systems may indicate valid, but comprise different responses.

In step 610, the first computing system determines whether the first transaction associated with the first reimbursement packet is valid based on the one or more responses. For example, each of the other computing systems can individually validate the first transaction data packet, and individually provide a response to the first transaction data packet back to the first computing system. The first computing system can receive the response from each of the other computing systems, and determine whether the first transaction is valid. Various techniques can be used to reconcile the responses from each of the other computing systems. For example, in some cases, the first computing system can determine that the first transaction is valid if all of the other computing systems indicate that it is valid. In some cases, the first computing system can determine that the first transaction is valid if a certain percentage or number of the other computing systems indicate that it is valid. In some cases, the first computing system can determine that the first transaction is valid if none of the other computing systems indicates that is invalid. Other criteria also can be used, depending on the implementation. In some embodiments, the origin reimbursement system performs the determination based on responses received from one or more origin reimbursement systems, intermediary reimbursement systems, and/or end-point reimbursement systems.

In some embodiments, the first computing system determines whether the first transaction associated with the first reimbursement packet is valid based on a subset of the one or more responses, e.g., responses from a particular type of computing system. In step 612, the first computing system adds a first entry to a first ledger if the first transaction is valid. The first entry may describe the first transaction. As described herein, the ledger can include a record of each transaction that was conducted by the entities of a reimbursement system. As an example, the ledger can include records for each prescription that was fulfilled by the pharmacies using the reimbursement system, each reimbursement request that was submitted by those pharmacies, and a corresponding reimbursement received by the pharmacies from a payer. In some embodiments, the first ledger may comprise a ledger that is local to the first computing system, which may be synchronized with one or more other ledgers, such as a "master" ledger and/or or ledgers local to other computing systems. As used herein, a master ledger may refer to a ledger that includes an up-to-date transaction history (or, "transaction chain").

In step 614, the first computing system facilitates synchronization of at least a portion of the first ledger (e.g., the entire first ledger or a portion of the first ledger corresponding to the first entry). In some cases, the first ledger is stored locally by the first computing system, and synchronized with the other ledgers stored in each of the other computing systems of the reimbursement system, such that each computing system maintains a consistent and complete ledger of each of the transactions conducted by the entities of the reimbursement system. As described herein, in some implementations, the first computing system can transmit a portion of the first ledger (e.g., a portion of the first ledger containing new or recent reimbursement transactions). In response, each of the other computing systems can update its own ledger based on the information. Thus, information regarding the transactions conducted on the reimbursement system is synchronized across each of the computing systems. In some cases, before transmitting a portion of the first ledger (e.g., a portion of the first ledger containing new or recent reimbursement transactions), the first computing system can cryptographically "sign" that portion (e.g., using a private cryptographic key that can be verified through a corresponding public cryptographic key). Thus, each portion or "block" that is transmitted can be attributed to the first computing system. As such, each computing system has a consistent and current ledger, and can attribute specific reimbursement transactions to specific computing systems (and corresponding entities) of the reimbursement system.

In step 616, the first computing system generates a first error and/or alert if the first transaction is invalid. In some embodiments, the origin computing system generates the first error and/or alert. The first error and/or alert may be added to the first ledger, thereby immutably recording the invalid transaction.

Figure 6B:
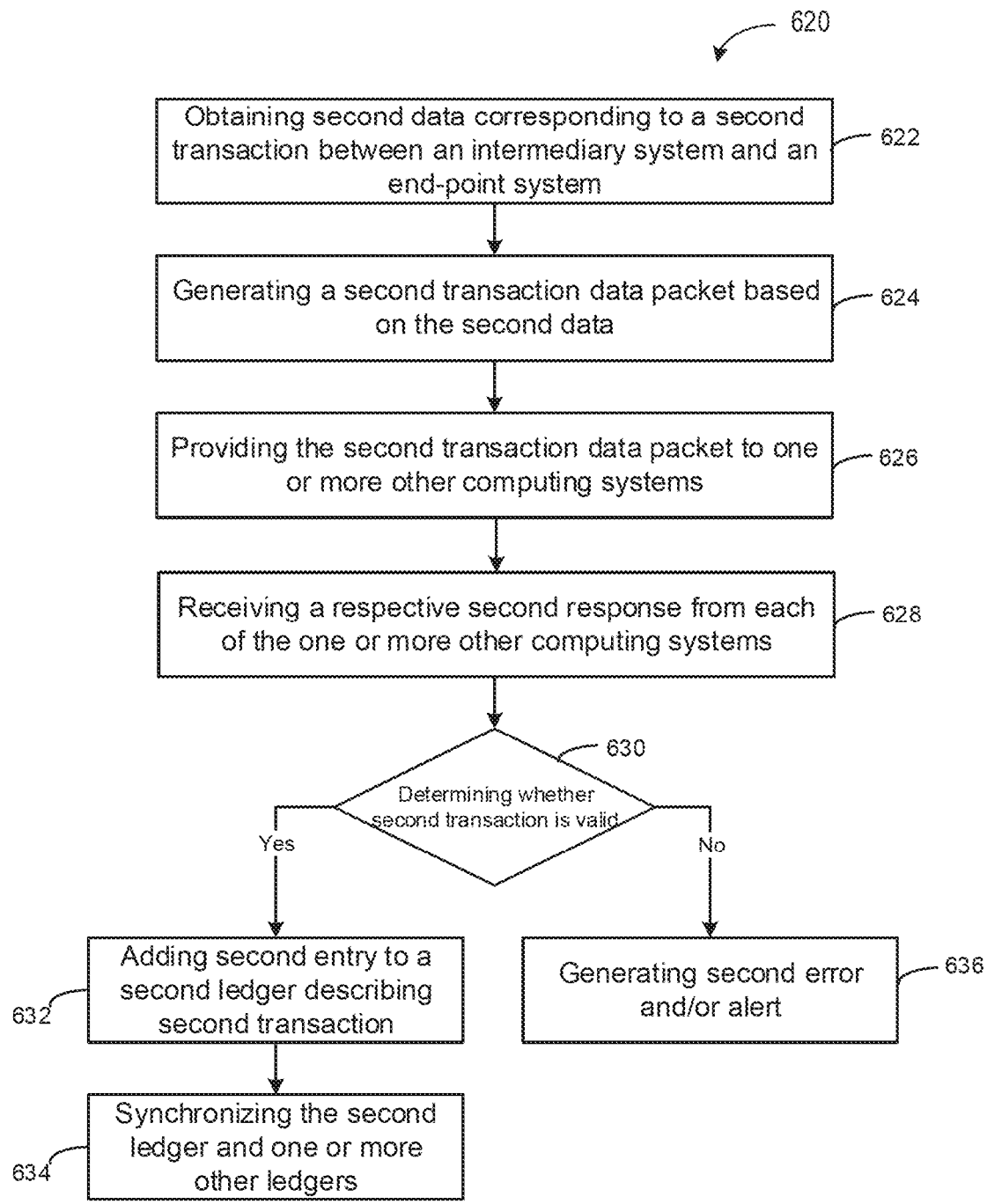
FIG. 6B depicts a flowchart of an example method of securely recording transactions between an intermediary system and an end-point system according to some embodiments.

FIG. 6B depicts a flowchart 620 of an example method of securely recording transactions (e.g., pharmacy-related or other supply-chain transactions) between an intermediary system and an end-point system.

In step 622, a second computing system obtains second data corresponding to a second transaction between an intermediary system and an end-point system. For example, the second transaction can include a wholesaler system providing product (e.g., pharmaceuticals) to a retail system, and the second data may include details of the transaction (e.g., date and time of transaction, type of product, quantity of product, price of product, pharmaceutical interactions, adjudication information, and the like). In some embodiments, an intermediary reimbursement system (e.g., intermediary reimbursement system 504) associated with the intermediary system obtains the second data.

In step 624, the second computing system generates a second transaction data packet based on the second data. In some embodiments, the intermediary reimbursement system generates the second transaction data packet. As described herein, the transaction data packet can include additional data describing the second transaction, such as details of the transaction, a reimbursement claim to be submitted to a payer system (e.g., payer system 510) for the transaction, and the like.

In step 626, the second computing system provides the second transaction data packet to one or more other computing systems (e.g., one or more origin reimbursement systems 502, intermediary reimbursement systems 504, and/or end-point reimbursement systems 506). In some embodiments, the intermediary computing system provides the second transaction data packet over a communications network (e.g., communications network 512).

In some embodiments, the second computing system provides the second transaction data packet to one or more selected other computing systems, e.g., selected origin reimbursement systems, selected intermediary reimbursement systems, selected end-point reimbursement systems, and/or a selected payer system. For example, the second computing system may select a subset of the other computer systems based on one or more rules. The rules may indicate a type of computing system that may be selected (e.g., an origin type, intermediary type, end-point type, payer type, and the like), a particular computing system (e.g., a known competitor or collaborator), and so forth.

In step 628, the second computing system receives a respective second response from each of the one or more other computing systems. As described herein, each response can indicate whether a respective one of the other computing systems determined that the second transaction is valid. For example, each of the other computing systems can validate the second transaction data packet, and provide the results of the validation to the second computing system via the communications network. This validation process can be performed automatically (e.g., automatically upon receipt of the second transaction data packet) or manually (e.g., in response to a manual user command). In some embodiments, the process for validating transaction data packets may be the same, or similar to, the process for validating reimbursement packets. In some embodiments, the intermediary reimbursement system receives the respective second response(s).

In some embodiments, the second computing system receives a respective first response from a selected subset of the one or more other computing systems or a selected subset of the one or more selected other computing systems. In various embodiments, the respective responses may be different although associated with the same result, e.g., valid or invalid. For example, two different computing systems may indicate valid, but comprise different responses.

In step 630, the second computing system determines whether the second transaction associated with the second reimbursement packet is valid based on the one or more responses. For example, each of the other computing systems can individually validate the second transaction data packet, and individually provide a response to the second transaction data packet back to the second computing system. The second computing system can receive the response from each of the other computing systems, and determine whether the second transaction is valid. Various techniques can be used to reconcile the responses from each of the other computing systems. For example, in some cases, the second computing system can determine that the second transaction is valid if all of the other computing systems indicate that it is valid. In some cases, the second computing system can determine that the second transaction is valid if a certain percentage or number of the other computing systems indicate that it is valid. In some cases, the second computing system can determine that the second transaction is valid if none of the other computing systems indicates that is invalid. Other criteria also can be used, depending on the implementation. In some embodiments, the intermediary reimbursement system performs the determination based on responses received from one or more intermediary reimbursement systems, intermediary reimbursement systems, and/or end-point reimbursement systems.

In some embodiments, the second computing system determines whether the second transaction associated with the first reimbursement packet is valid based on a subset of the one or more responses, e.g., responses from a particular type of computing system.

In step 632, the second computing system adds a second entry to a second ledger if the second transaction is valid. The second entry may describe the second transaction. As described herein, the ledger can include a record of each transaction that was conducted by the entities of a reimbursement system. As an example, the ledger can include records for each prescription that was fulfilled by the pharmacies using the reimbursement system, each reimbursement request that was submitted by those pharmacies, and a corresponding reimbursement received by the pharmacies from a payer. In some embodiments, the second ledger may comprise a ledger that is local to the second computing system, which may be synchronized with one or more other ledgers, such as a "master" ledger and/or or ledgers local to other computing systems. As used herein, a master ledger may refer to a ledger that includes an up-to-date transaction history (or, "transaction chain").

In step 634, the second computing system facilitates synchronization of at least a portion of the second ledger (e.g., the entire second ledger or a portion of the second ledger corresponding to the second entry). In some cases, the second ledger is stored locally by the second computing system, and synchronized with the other ledgers stored in each of the other computing systems of the reimbursement system, such that each computing system maintains a consistent and complete ledger of each of the transactions conducted by the entities of the reimbursement system. As described herein, in some implementations, the second computing system can transmit a portion of the second ledger (e.g., a portion of the second ledger containing new or recent reimbursement transactions). In response, each of the other computing systems can update its own ledger based on the information. Thus, information regarding the transactions conducted on the reimbursement system is synchronized across each of the computing systems. In some cases, before transmitting a portion of the second ledger (e.g., a portion of the second ledger containing new or recent reimbursement transactions), the second computing system can cryptographically "sign" that portion (e.g., using a private cryptographic key that can be verified through a corresponding public cryptographic key). Thus, each portion or "block" that is transmitted can be attributed to the second computing system. As such, each computing system has a consistent and current ledger, and can attribute specific reimbursement transactions to specific computing systems (and corresponding entities) of the reimbursement system.

In step 636, the second computing system generates a second error and/or alert if the second transaction is invalid. In some embodiments, the intermediary computing system generates the second error and/or alert. The second error and/or alert may be added to the second ledger, thereby immutably recording the invalid transaction.

Figure 6C:
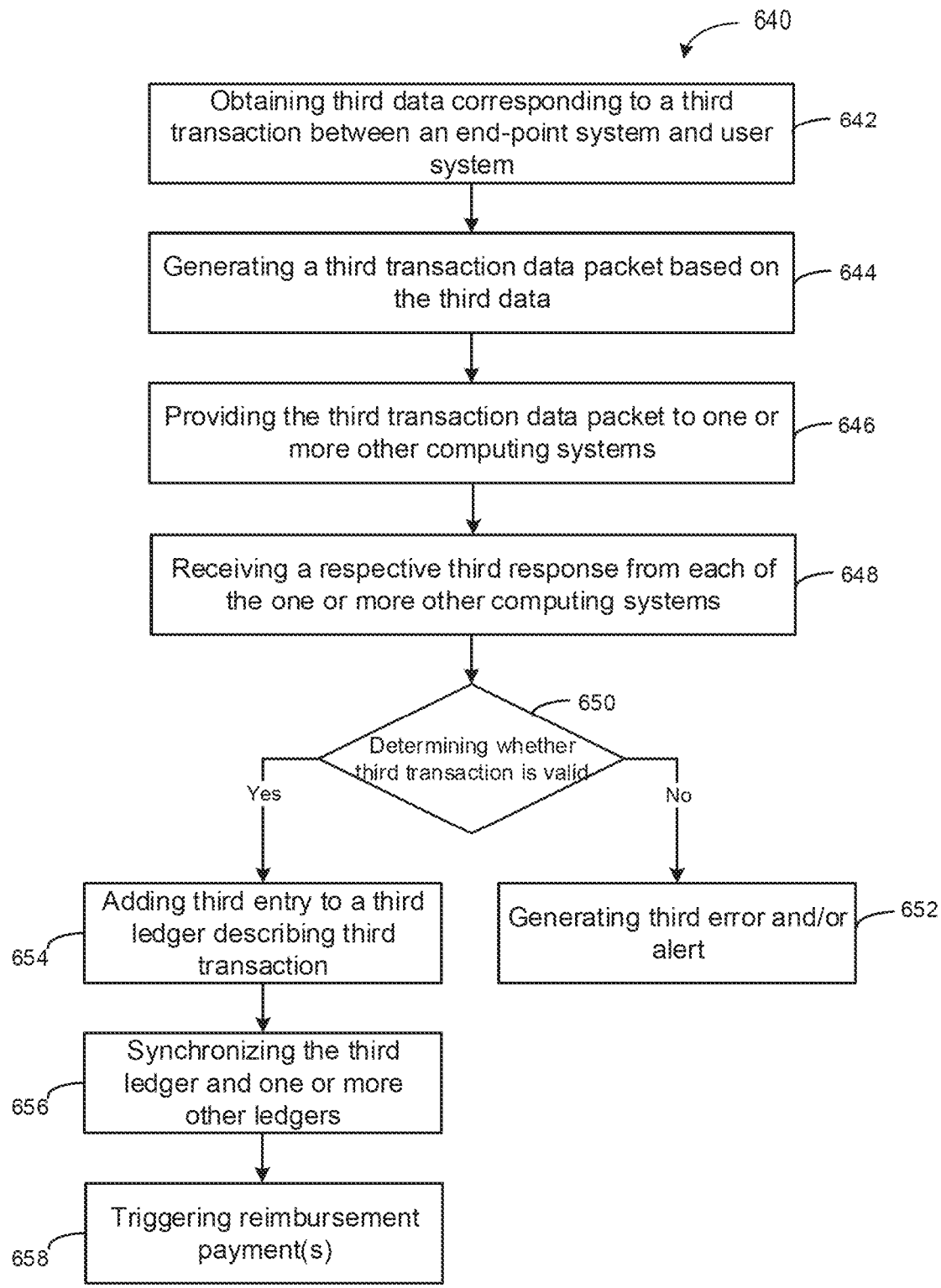
FIG. 6C depicts a flowchart of an example method of securely recording and reimbursing transactions between an end-point system and a user according to some embodiments.

FIG. 6C depicts a flowchart 640 of an example method of securely recording and reimbursing transactions (e.g., pharmacy-related or other supply-chain transactions) between an end-point system and a user.

In step 642, a third computing system obtains third data corresponding to a third transaction between an end-point system and a user. For example, the third transaction can include a retail system dispensing product (e.g., pharmaceuticals) to a user, and the third data may include details of the transaction (e.g., date and time of transaction, type of product, quantity of product, price of product, pharmaceutical interactions, adjudication information, and the like). In some embodiments, an end-point reimbursement system (e.g., end-point reimbursement system 506) associated with the end-point system obtains the third data.

In step 644, the third computing system generates a third transaction data packet based on the third data. In some embodiments, the end-point reimbursement system generates the third transaction data packet. As described herein, the transaction data packet can include additional data describing the third transaction, such as details of the transaction, a reimbursement claim to be submitted to a payer system (e.g., payer system 510) for the transaction, and the like.

In step 646, the third computing system provides the third transaction data packet to one or more other computing systems (e.g., one or more origin reimbursement systems 502, intermediary reimbursement systems 504, and/or end-point reimbursement systems 506). In some embodiments, the end-point computing system provides the third transaction data packet over a communications network (e.g., communications network 512).

In some embodiments, the third computing system provides the third transaction data packet to one or more selected other computing systems, e.g., selected origin reimbursement systems, selected intermediary reimbursement systems, selected end-point reimbursement systems, and/or a selected payer system. For example, the third computing system may select a subset of the other computer systems based on one or more rules. The rules may indicate a type of computing system that may be selected (e.g., an origin type, intermediary type, end-point type, payer type, and the like), a particular computing system (e.g., a known competitor or collaborator), and so forth.

In step 648, the third computing system receives a respective third response from each of the one or more other computing systems. As described herein, each response can indicate whether a respective one of the other computing systems determined that the third transaction is valid. For example, each of the other computing systems can validate the third transaction data packet, and provide the results of the validation to the third computing system via the communications network. This validation process can be performed automatically (e.g., automatically upon receipt of the third transaction data packet) or manually (e.g., in response to a manual user command). In some embodiments, the process for validating transaction data packets may be the same, or similar to, the process for validating reimbursement packets. In some embodiments, the end-point reimbursement system receives the respective third response(s).

In some embodiments, the third computing system receives a respective first response from a selected subset of the one or more other computing systems or a selected subset of the one or more selected other computing systems. In various embodiments, the respective responses may be different although associated with the same result, e.g., valid or invalid. For example, two different computing systems may indicate valid, but comprise different responses.

In step 650, the third computing system determines whether the third transaction associated with the third reimbursement packet is valid based on the one or more responses. For example, each of the other computing systems can individually validate the third transaction data packet, and individually provide a response to the third transaction data packet back to the third computing system. The third computing system can receive the response from each of the other computing systems, and determine whether the third transaction is valid. Various techniques can be used to reconcile the responses from each of the other computing systems. For example, in some cases, the third computing system can determine that the third transaction is valid if all of the other computing systems indicate that it is valid. In some cases, the third computing system can determine that the third transaction is valid if a certain percentage or number of the other computing systems indicate that it is valid. In some cases, the third computing system can determine that the third transaction is valid if none of the other computing systems indicates that is invalid. Other criteria also can be used, depending on the implementation. In some embodiments, the end-point reimbursement system performs the determination based on responses received from one or more end-point reimbursement systems, end-point reimbursement systems, and/or end-point reimbursement systems.

In step 652, the third computing system adds a third entry to a third ledger if the third transaction is valid. The third entry may describe the third transaction. As described herein, the ledger can include a record of each transaction that was conducted by the entities of a reimbursement system. As an example, the ledger can include records for each prescription that was fulfilled by the pharmacies using the reimbursement system, each reimbursement request that was submitted by those pharmacies, and a corresponding reimbursement received by the pharmacies from a payer. In some embodiments, the third ledger may comprise a ledger that is local to the third computing system, which may be synchronized with one or more other ledgers, such as a "master" ledger and/or or ledgers local to other computing systems. As used herein, a master ledger may refer to a ledger that includes an up-to-date transaction history (or, "transaction chain").

In step 654, the third computing system facilitates synchronization of at least a portion of the third ledger (e.g., the entire third ledger or a portion of the third ledger corresponding to the third entry). In some cases, the third ledger is stored locally by the third computing system, and synchronized with the other ledgers stored in each of the other computing systems of the reimbursement system, such that each computing system maintains a consistent and complete ledger of each of the transactions conducted by the entities of the reimbursement system. As described herein, in some implementations, the third computing system can transmit a portion of the third ledger (e.g., a portion of the third ledger containing new or recent reimbursement transactions). In response, each of the other computing systems can update its own ledger based on the information. Thus, information regarding the transactions conducted on the reimbursement system is synchronized across each of the computing systems. In some cases, before transmitting a portion of the third ledger (e.g., a portion of the third ledger containing new or recent reimbursement transactions), the third computing system can cryptographically "sign" that portion (e.g., using a private cryptographic key that can be verified through a corresponding public cryptographic key). Thus, each portion or "block" that is transmitted can be attributed to the third computing system. As such, each computing system has a consistent and current ledger, and can attribute specific reimbursement transactions to specific computing systems (and corresponding entities) of the reimbursement system.

In step 656, the third computing system generates a third error and/or alert if the third transaction is invalid. In some embodiments, the end-point computing system generates the third error and/or alert. The third error and/or alert may be added to the third ledger, thereby immutably recording the invalid transaction.

Figure 7:
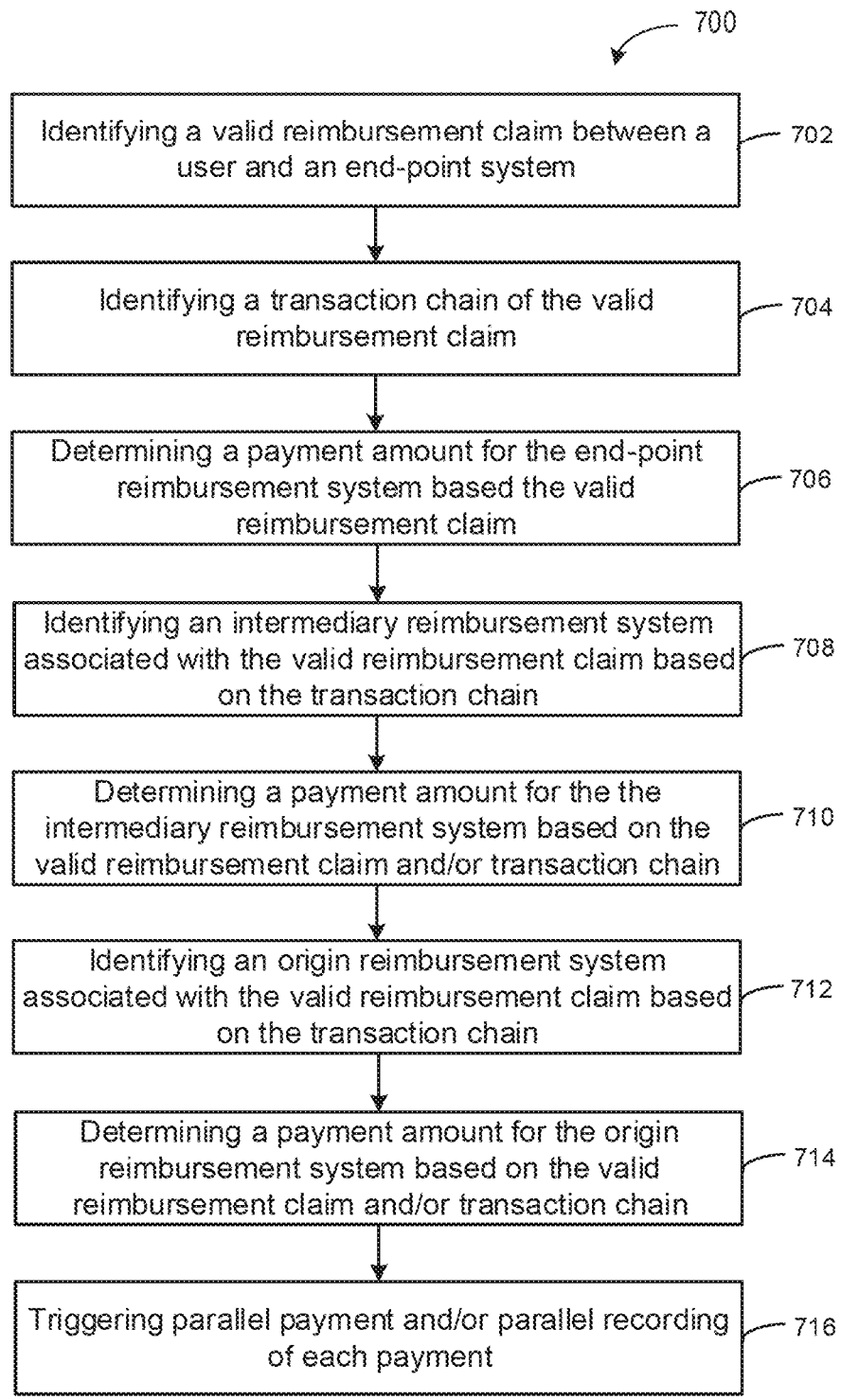
FIG. 7 depicts a flowchart of an example method of parallel recording of multi-system transactions according to some embodiments.

FIG. 7 depicts a flowchart 700 of an example method of parallel recording of multi-system transactions according to some embodiments.

In step 702, a computing system identifies a valid reimbursement claim between a user (e.g., a patient) and an end-point system (e.g., a pharmacy system). For example, the end-point reimbursement system may be automatically triggered in response to a recorded valid reimbursement claim, or other recorded transaction. In some embodiments, an end-point reimbursement system (e.g., end-point reimbursement system 506) identifies the valid reimbursement claim.

In step 704, the computing system identifies a transaction chain of the valid reimbursement claim. The transaction chain may comprise the chain of records forming a transaction history associated with the reimbursement claim. For example, the transaction chain may include all of the recorded transactions associated with a particular reimbursement claim, a particular product (e.g., pharmaceutical), and the like.

In step 706, the computing system determines a payment amount for the end-point reimbursement system based on the valid reimbursement claim and/or the transaction chain. For example, if a reimbursement claim instructs a payer system (e.g., payer system 510) to provide payments for a total amount (e.g., $200) for a particular claim, the computing system may determine from the transaction chain a first portion (e.g., a percentage or currency value) of the total amount to be provided to an origin reimbursement system (e.g., origin reimbursement system 502).

In step 708, the computing system identifies an intermediary reimbursement system (e.g., intermediary reimbursement system 504) associated with the valid reimbursement claim based on the transaction chain. For example, the computing system may traverse or otherwise search the transaction chain to identify the intermediary reimbursement system.

In step 710, the computing system determines a payment amount for the intermediary reimbursement system based on the valid reimbursement claim and/or transaction chain. For example, if the reimbursement claim indicates the payer system to provide payments for a total amount for a particular claim, the computing system may determine from the transaction chain a second portion (e.g., a percentage or currency value) of the total amount to be provided to the intermediary reimbursement system.

In step 712, the computing system identifies an origin reimbursement system associated with the valid reimbursement claim based on the transaction chain. For example, the computing system may traverse or otherwise search the transaction chain to identify the origin reimbursement system.

In step 714, the computing system determines a payment amount for the origin reimbursement system based on the valid reimbursement claim and/or transaction chain. For example, if a reimbursement claim instructs the payer system to provide payments for a total amount for a particular claim, the computing system may determine from the transaction chain a third portion (e.g., a percentage or currency value) of the total amount to be provided to the origin reimbursement system.

In step 716, the computing system triggers, or otherwise causes, parallel recording and/or parallel payment of the payment amounts for the end-user reimbursement system, the intermediary reimbursement system, and the origin reimbursement system. Accordingly, recording and/or payment for each of the reimbursement systems may be effected at the same, or substantially same, time as each other, without any delay and/or with minimal delay. For example, the computing system may instruct the payer system to provide payment to each of the reimbursement systems from an associated funds source (e.g., a bank), rather than from a prior payment to a related reimbursement system (e.g., providing payment to an origin reimbursement system from a payment received by an intermediary reimbursement system and/or end-point reimbursement system).

Figure 8:
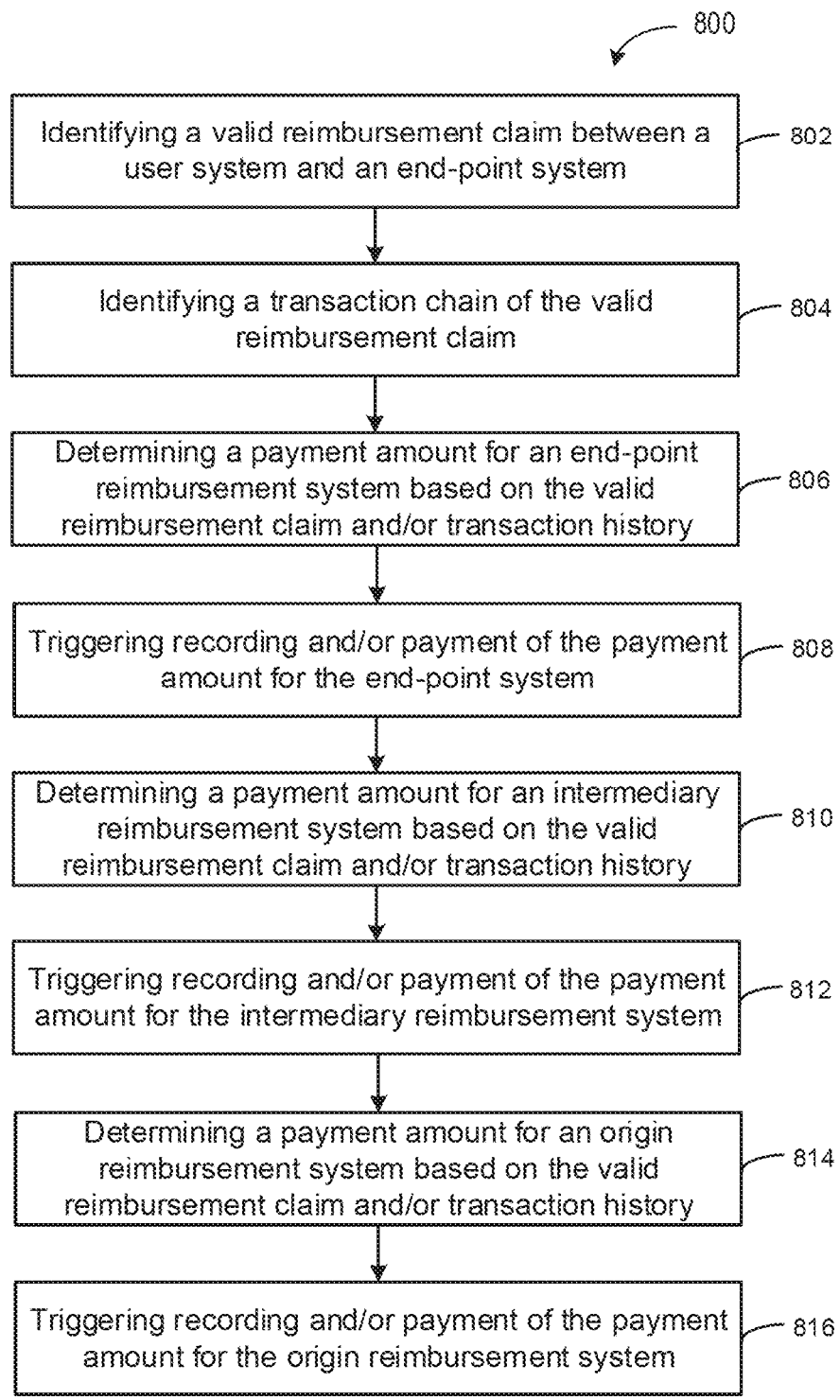
FIG. 8 depicts a flowchart of an example method of linear recording of transactions according to some embodiments.

FIG. 8 depicts a flowchart 800 of an example method of linear recording and/or payment of transactions according to some embodiments.

In step 802, a computing system identifies a valid reimbursement claim between a user and an end-point system. (e.g., a patient) and an end-point system (e.g., a pharmacy system). For the example, the end-point reimbursement system may be automatically triggered in response to a recorded valid reimbursement claim and/or other transaction. In some embodiments, an end-point reimbursement system (e.g., end-point reimbursement system 506) identifies the valid reimbursement claim.

In step 804, the computing system identifies a transaction chain of the valid reimbursement claim. The transaction chain may comprise the chain of records forming a transaction history associated with the reimbursement claim. For example, the transaction chain may include all of the transactions associated with a particular reimbursement claim, a particular product (e.g., pharmaceutical), and the like.

In step 806, the computing system determines a payment amount for the end-point reimbursement system based on the valid reimbursement claim and/or transaction history. For example, the computing system may traverse or otherwise search the transaction chain to determine the amount.

In step 808, the computing system triggers, or otherwise causes, recording and/or payment of the payment amount for the end-point system. In some embodiments, the computing system instructs a payer system (e.g., payer system 510) to provide payment to the end-point system, e.g., from a fund source and/or from a prior payment to a reimbursement system.

In step 810, the computing system determines a payment amount for an intermediary reimbursement system (e.g., an intermediary reimbursement system 504) based on the valid reimbursement claim and/or transaction history. For example, the computing system may traverse or otherwise search the transaction chain to determine the amount.

In step 812, the computing system triggers, or otherwise causes, recording and/or payment of the payment amount for the intermediary reimbursement system. In some embodiments, the computing system instructs the payer system to provide payment to the intermediary system, e.g., from the fund source and/or from a prior payment to a reimbursement system.

In step 814, the computing system determines a payment amount for an origin reimbursement system (e.g., an origin reimbursement system 502) based on the valid reimbursement claim and/or transaction history. For example, the computing system may traverse or otherwise search the transaction chain to determine the amount.

In step 816, the computing system triggers, or otherwise causes, recording and/or payment of the payment amount for the origin reimbursement system. In some embodiments, the computing system instructs the payer system to provide payment to the origin system, e.g., from the fund source and/or from a prior payment to a reimbursement system.

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, the computing systems 110*a*-*d*, the reimbursement platforms 120*a*-*d*, and the client devices 130*a* and 130*b* can be implemented using digital electronic circuitry, or in computer software, firmware, or hardware, or in combinations of one or more of them. In another example, processes depicted in FIGS. 3A-H, FIGS. 6A-C, and/or FIGS. 7 and 8 can be implemented using digital electronic circuitry, or in computer software, firmware, or hardware, or in combinations of one or more of them.

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 9:
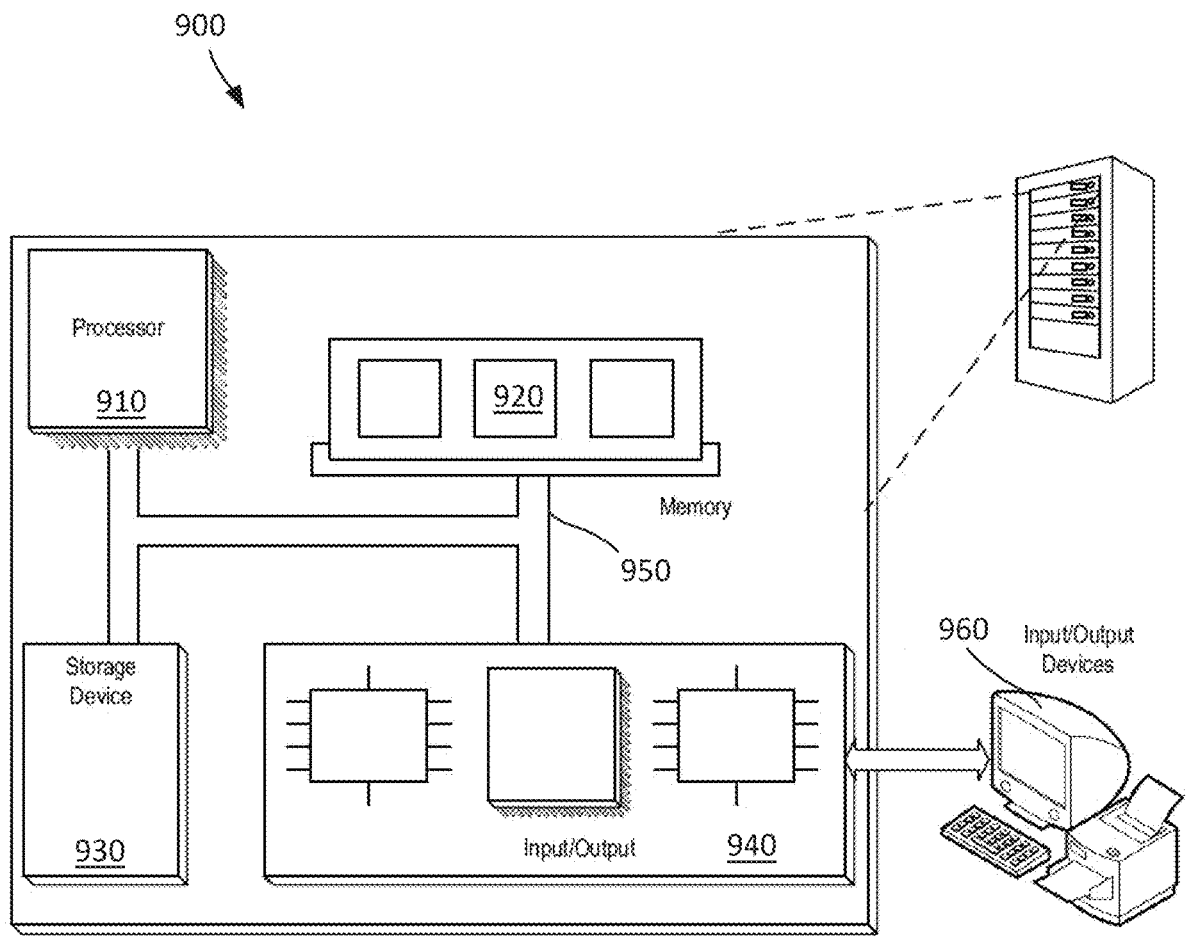
FIG. 9 is a diagram of an example computer system for implementing the features disclosed herein.

FIG. 9 shows an example computer system 900 that includes a processor 910, a memory 920, a storage device 930 and an input/output device 940. Each of the components 910, 920, 930 and 940 can be interconnected, for example, by a system bus 950. The processor 910 is capable of processing instructions for execution within the system 900. In some implementations, the processor 910 is a single-threaded processor, a multi-threaded processor, or another type of processor. The processor 910 is capable of processing instructions stored in the memory 920 or on the storage device 930. The memory 920 and the storage device 930 can store information within the system 900.

The input/output device 940 provides input/output operations for the system 900. In some implementations, the input/output device 940 can include one or more of a network interface devices, e.g., an Ethernet card, a serial communication device, e.g., an RS-232 port, and/or a wireless interface device, e.g., an 802.11 card, a 3G wireless modem, a 4G wireless modem, etc. In some implementations, the input/output device can include driver devices configured to receive input data and send output data to other input/output devices, e.g., keyboard, printer and display devices 960. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of implementations have been described. Nevertheless, it will be understood that various modifications may be made without departing from the spirit and scope of the invention. Accordingly, other implementations are within the scope of the following claims.

What is claimed is:

1. A decentralized method of initiating reimbursement of pharmacy-related transactions, the method comprising:
   receiving first supply data about a supply transaction between a first wholesaler and a first pharmacy, wherein the supply transaction comprises supplying a medication by the first wholesaler to the first pharmacy;
   generating a wholesaler reimbursement data packet based on the first supply data, wherein the wholesaler reimbursement data packet comprises second supply data about a wholesaler reimbursement claim, the second supply data including a quantity of the medication dispensed by the first wholesaler to the first pharmacy and a requested wholesaler reimbursement amount for the wholesaler reimbursement claim;
   transmitting the wholesaler reimbursement data packet to a payer computer system of a payer and to a plurality of second wholesaler computer systems of a plurality of second wholesalers outside of the supply transaction and listed in a wholesaler directory;
   receiving a wholesaler response from each second wholesaler computer system of the plurality of second wholesaler computer systems, wherein each wholesaler response indicates whether a respective one of the plurality of second wholesaler computer systems determined that the wholesaler reimbursement claim is valid, the wholesaler response of each second wholesaler computer system of the plurality of second wholesaler computer systems being determined based on a wholesaler condition involving the quantity of the medication and on the requested wholesaler reimbursement amount for the wholesaler reimbursement claim;
   determining that the wholesaler reimbursement claim is validated based on the wholesaler responses from the plurality of second wholesaler computer systems;
   adding an immutable wholesaler entry about the supply transaction and the wholesaler reimbursement claim to a first electronic ledger, the immutable wholesaler entry being cryptographically signed;
   transmitting, after adding the immutable wholesaler entry about the supply transaction and the wholesaler reimbursement claim to the first electronic ledger, at least a portion of the first electronic ledger that includes the immutable wholesaler entry to each second wholesaler computer system of the plurality of second wholesaler computer systems and to the payer computer system;
   receiving, at a first pharmacy computer system associated with the first pharmacy, first pharmacy data about a pharmacy transaction between a patient and the first pharmacy, wherein the pharmacy transaction comprises dispensing of the medication by the first pharmacy to the patient;
   generating, at the first pharmacy computer system, a pharmacy reimbursement data packet based on the first pharmacy data, wherein the pharmacy reimbursement data packet comprises second pharmacy data about a pharmacy reimbursement claim associated with the pharmacy transaction, the second pharmacy data including a quantity of the medication dispensed by the first pharmacy to the patient and a requested pharmacy reimbursement amount for the pharmacy reimbursement claim;
   transmitting, via a computer network, the pharmacy reimbursement data packet from the first pharmacy computer system to the payer computer system and to a plurality of second pharmacy computer systems of a plurality of second pharmacies outside of the transaction and listed in a pharmacy directory;
   receiving, via the computer network, a pharmacy response from each second pharmacy computer system of the plurality of second pharmacy computer systems, wherein each pharmacy response indicates whether a respective one of the plurality of second pharmacy computer systems determined that the pharmacy reimbursement claim is valid, the pharmacy response of each second pharmacy computer system of the plurality of second pharmacy computer systems being determined based on a pharmacy condition involving the quantity of the medication and on the requested pharmacy reimbursement amount for the pharmacy reimbursement claim;
   determining that the pharmacy reimbursement claim is validated based on the pharmacy responses from the plurality of second pharmacy computer systems;
   adding an immutable pharmacy entry about the pharmacy transaction and the pharmacy reimbursement claim to a pharmacy electronic ledger, the pharmacy electronic ledger being stored by the first pharmacy computer system, the immutable pharmacy entry being cryptographically signed by the first pharmacy computer system; and
   transmitting, after adding the immutable pharmacy entry about the pharmacy transaction and the pharmacy reimbursement claim to the pharmacy electronic ledger, at least a portion of the pharmacy electronic ledger that includes the immutable pharmacy entry to the payer computer system, the validated pharmacy reimbursement claim contained in the at least a portion of the pharmacy electronic ledger causing the payer computer system to initiate processing of the pharmacy reimbursement claim and the wholesaler reimbursement claim.

2. The method of claim 1, wherein the receiving the pharmacy response from each second pharmacy computer system of the plurality of second pharmacy computer systems comprises receiving the pharmacy response from each of a selected subset of the second pharmacy computer systems listed in the pharmacy directory.

3. The method of claim 1, wherein the pharmacy condition involves a determination whether the requested pharmacy reimbursement amount is reasonable relative to the quantity of the medication.

4. The method of claim 1, wherein the pharmacy condition involves a determination whether the quantity of the medication is within reasonable limits.

5. The method of claim 1, wherein the pharmacy condition involves a determination whether the medication is normally prescribed by doctors.

6. The method of claim 1, wherein the pharmacy condition involves a determination whether a historical amount of the medication being dispensed by the first pharmacy is within an expected range, the expected range being calculated from an analysis of transactions on the pharmacy electronic ledger.

7. The method of claim 1, wherein the plurality of second pharmacy computer systems includes all of the second pharmacy computer systems associated with a pharmacy listed in the pharmacy directory.

8. The method of claim 7, wherein the pharmacy directory can be modified to add or remove particular second pharmacy computer systems.

9. A decentralized system for initiating reimbursement of pharmacy-related transactions, the system comprising:
one or more processors; and
memory storing instructions that, when executed by the one or more processors, cause the system to perform:
receiving first supply data about a supply transaction between a first wholesaler and a first pharmacy, wherein the supply transaction comprises supplying a medication by the first wholesaler to the first pharmacy;
generating a wholesaler reimbursement data packet based on the first supply data, wherein the wholesaler reimbursement data packet comprises second supply data about a wholesaler reimbursement claim, the second supply data including a quantity of the medication dispensed by the first wholesaler to the first pharmacy and a requested wholesaler reimbursement amount for the wholesaler reimbursement claim;
transmitting the wholesaler reimbursement data packet to a payer computer system of a payer and to a plurality of second wholesaler computer systems of a plurality of second wholesalers outside of the supply transaction and listed in a wholesaler directory;
receiving a wholesaler response from each second wholesaler computer system of the plurality of second wholesaler computer systems, wherein each wholesaler response indicates whether a respective one of the plurality of second wholesaler computer systems determined that the wholesaler reimbursement claim is valid, the wholesaler response of each second wholesaler computer system of the plurality of second wholesaler computer systems being determined based on a wholesaler condition involving the quantity of the medication and on the requested wholesaler reimbursement amount for the wholesaler reimbursement claim;
determining that the wholesaler reimbursement claim is validated based on the wholesaler responses from the plurality of second wholesaler computer systems;
adding an immutable wholesaler entry about the supply transaction and the wholesaler reimbursement claim to a first electronic ledger, the immutable wholesaler entry being cryptographically signed;
transmitting, after adding the immutable entry about the supply transaction and the wholesaler reimbursement claim to the first electronic ledger, at least a portion of the first electronic ledger that includes the immutable wholesaler entry to each second wholesaler computer system of the plurality of second wholesaler computer systems and to the payer computer system;
receiving, at a first pharmacy computer system associated with the first pharmacy, first pharmacy data about a pharmacy transaction between a patient and the first pharmacy, wherein the pharmacy transaction comprises dispensing of the medication by the first pharmacy to the patient;
generating, at the first pharmacy computer system, a pharmacy reimbursement data packet based on the first pharmacy data, wherein the pharmacy reimbursement data packet comprises second pharmacy data about a pharmacy reimbursement claim associated with the pharmacy transaction, the second pharmacy data including a quantity of the medication dispensed by the first pharmacy to the patient and a requested pharmacy reimbursement amount for the pharmacy reimbursement claim;
transmitting, via a computer network, the pharmacy reimbursement data packet from the first pharmacy computer system to the payer computer system and to a plurality of second pharmacy computer systems of a plurality of second pharmacies outside of the transaction and listed in a pharmacy directory;
receiving, via the computer network, a pharmacy response from each second pharmacy computer system of the plurality of second pharmacy computer systems, wherein each pharmacy response indicates whether a respective one of the plurality of second pharmacy computer systems determined that the pharmacy reimbursement claim is valid, the pharmacy response of each second pharmacy computer system of the plurality of second pharmacy computer systems being determined based on a pharmacy condition involving the quantity of the medication and on the requested pharmacy reimbursement amount for the pharmacy reimbursement claim;
determining that the pharmacy reimbursement claim is validated based on the pharmacy responses from the plurality of second pharmacy computer systems;
adding an immutable pharmacy entry about the pharmacy transaction and the pharmacy reimbursement claim to a pharmacy electronic ledger, the pharmacy electronic ledger being stored by the first pharmacy computer system, the immutable pharmacy entry being cryptographically signed by the first pharmacy computer system; and
transmitting, after adding the immutable pharmacy entry about the pharmacy transaction and the pharmacy reimbursement claim to the pharmacy electronic ledger, at least a portion of the pharmacy electronic ledger that includes the immutable pharmacy entry to the payer computer system, the validated pharmacy reimbursement claim contained in the at least a portion of the pharmacy electronic ledger causing the payer computer system to initiate processing of the pharmacy reimbursement claim and the wholesaler reimbursement claim.

10. The system of claim 9, wherein the instructions are further configured to cause the system to receive the pharmacy response from each of a selected subset of the second pharmacy computer systems listed in the pharmacy directory.

11. The system of claim 9, wherein the pharmacy condition involves a determination whether the requested pharmacy reimbursement amount is reasonable relative to the quantity of the medication.

12. The system of claim 9, wherein the pharmacy condition involves a determination whether the quantity of the medication is within reasonable limits.

13. The system of claim 9, wherein the pharmacy condition involves a determination whether the medication is normally prescribed by doctors.

14. The system of claim 9, wherein the pharmacy condition involves a determination whether a historical amount of the medication being dispensed by the pharmacy is within an expected range, the expected range being calculated from an analysis of transactions on the pharmacy electronic ledger.

15. The system of claim 9, wherein the plurality of second pharmacy computer systems includes all of the second pharmacy computer systems associated with a pharmacy listed in the pharmacy directory.

16. The system of claim 15, wherein the pharmacy directory can be modified to add or remove particular second pharmacy computer systems.

\* \* \* \* \*